US012716602B2

(12) United States Patent
Vickers et al.

(10) Patent No.: US 12,716,602 B2
(45) Date of Patent: Aug. 25, 2026

(54) INTELLIGENT BRIGHTNESS LOCK FOR SMART THERMOSTAT

(71) Applicant: Google LLC, Mountain View, CA (US)

(72) Inventors: Lucas Vickers, Astoria, NY (US); Junnosuke Kurihara, Milpitas, CA (US); Sathya Nanda Gopal Kurcharlapati, San Jose, CA (US)

(73) Assignee: Google LLC, Mountain View, CA (US)

( * ) Notice: Subject to any disclaimer, the term of this patent is extended or adjusted under 35 U.S.C. 154(b) by 324 days.

(21) Appl. No.: 18/624,387

(22) Filed: Apr. 2, 2024

(65) Prior Publication Data

US 2025/0305699 A1 Oct. 2, 2025

(51) Int. Cl.

| | |
|---|---|
| ***F24F 11/52*** | (2018.01) |
| ***F24F 11/523*** | (2018.01) |
| ***G01S 5/02*** | (2010.01) |
| ***G02F 1/1335*** | (2006.01) |
| ***G06F 1/3231*** | (2019.01) |

(52) U.S. Cl.

CPC ............ *F24F 11/52* (2018.01); *F24F 11/523* (2018.01); *G01S 5/02* (2013.01); *G02F 1/133618* (2021.01); *G06F 1/3231* (2013.01)

(58) Field of Classification Search

CPC . F24F 11/52; F24F 11/523; G01S 5/02; G02F 1/133618; G06F 1/3231

See application file for complete search history.

(56) References Cited

U.S. PATENT DOCUMENTS

2022/0390134 A1* 12/2022 Chung .................. F24F 11/523

* cited by examiner

*Primary Examiner* — Michael W Choi

(74) *Attorney, Agent, or Firm* — Lerner David LLP

(57) ABSTRACT

Features described herein pertain to smart thermostats, and more particularly, an intelligent brightness lock for smart thermostats. A smart thermostat can include a display, an ambient light sensor, and a radar sensor. Using the ambient light sensor, ambient light level values of an environment surrounding the smart thermostat can be measured. Radar data can be received from the radar sensor, and based on the radar data, a determination can be made that a distance between a person and the smart thermostat is less than a predetermined distance. In response, a brightness lock mode is started which causes content to be displayed on the display at a second brightness level that is equal to or greater than a first brightness level.

20 Claims, 18 Drawing Sheets

160

Network 140

Cloud-based Server System 150

Wall Plate 130

Backplate 120

HVAC System 125

Smart Thermostat

Lens Assembly 122

Housing 121

Processing System 119

HVAC Interface 118

Electronic Display 111

User Interface 112

Radar Sensor 113

Network Interface 114

Speaker 115

Ambient Light Sensor 116

Temperature Sensor(s) 117

110

INTELLIGENT BRIGHTNESS LOCK FOR SMART THERMOSTAT

BACKGROUND

Systems for remotely operating air handling systems (such as heating, ventilation, and air conditioning, or HVAC, systems) have become prevalent. In such systems, control of the air handling systems is often effectuated based on an end user's interactions with a control application that is executing on the end user's electronic device. Cloud-based servers often facilitate communication between these electronic devices and the air handling systems. While remote control of air handling systems is convenient, it may be desirable to provide a feature-rich means to effectuate local control of these air handling systems.

SUMMARY

Embodiments described herein pertain to smart thermostats, and more particularly, an intelligent brightness lock for smart thermostats.

In some embodiments, a smart thermostat includes a display, an ambient light sensor, a radar sensor, a processing system, and at least one computer-readable medium storing instructions which, when executed by the processing system, cause the smart thermostat to perform operations including measuring, using the ambient light sensor, a plurality of ambient light level values of an environment surrounding the smart thermostat; displaying, on the display, content at a first brightness level; acquiring, from the radar sensor, radar data indicative of motion in the environment surrounding the smart thermostat; determining, based on the radar data, that a distance between a person and the smart thermostat is equal to or less than a predetermined distance; and in response to determining that the distance is less than the predetermined distance, starting a brightness lock mode, wherein starting the brightness lock mode causes the content to be displayed on the display at a second brightness level that is equal to or greater than the first brightness level.

In some embodiments, starting the brightness lock mode includes determining a maximum ambient light level value of the plurality of ambient light level values within a time window prior to starting the brightness lock mode; using the maximum ambient light level value to extract an intermediate brightness level from the brightness curve; and determining the second brightness level based on the intermediate brightness level.

In some embodiments, the operations further include, while in the brightness lock mode, starting a timer for measuring a predetermined period of time; determining that the person operated the smart thermostat; and in response to determining that the person operated the smart thermostat, restarting the timer.

In some embodiments, the operations further include, while in the brightness lock mode, starting a timer for measuring a predetermined period of time; determining, based on additional radar data acquired from the radar sensor, that the distance between the person and the smart thermostat is equal to or less than the predetermined distance; and in response to determining that the distance between the person and the smart thermostat is equal to or less than the predetermined distance, restarting the timer.

In some embodiments, the operations further include, while in the brightness lock mode, starting a timer for measuring a predetermined period of time; determining that the predetermined period of time has not elapsed; in response to determining that the predetermined period of time has not elapsed, determining whether or not the person has operated the smart thermostat.

In some embodiments, the operations further include, while in the brightness lock mode, starting a timer for measuring a predetermined period of time; determining that the predetermined period of time has elapsed; in response to determining that the predetermined period of time has elapsed, ending the brightness lock mode and causing the content to be displayed on the display at a third brightness level.

In some embodiments, the content is first content that includes an ambient temperature of the environment surrounding the smart thermostat, and starting the brightness lock mode causes second content to be displayed at the second brightness level, wherein the second content includes a temperature set point of an air management system in communication with the smart thermostat.

In some embodiments, a method includes measuring, using an ambient light sensor of the smart thermostat, a plurality of ambient light level values of an environment surrounding the smart thermostat; displaying, on the display, content at a first brightness level; acquiring, from a radar sensor of the smart thermostat, radar data indicative of motion in the environment surrounding the smart thermostat; determining, based on the radar data, that a distance between a person and the smart thermostat is less than a predetermined distance; and in response to determining that the distance is less than the predetermined distance, starting a brightness lock mode, wherein starting the brightness lock mode causes the content to be displayed on the display at a second brightness level that is equal to or greater than the first brightness level.

In some embodiments, starting the brightness lock mode includes determining a maximum ambient light level value of the plurality of ambient light level values within a time window prior to starting the brightness lock mode; using the maximum ambient light level value to extract an intermediate brightness level from the brightness curve; and determining the second brightness level based on the intermediate brightness level.

In some embodiments, a method includes, while in the brightness lock mode, starting a timer for measuring a predetermined period of time; determining that the person operated the smart thermostat; and in response to determining that the person operated the smart thermostat, restarting the timer.

In some embodiments, a method includes, while in the brightness lock mode, starting a timer for measuring a predetermined period of time; determining, based on additional radar data acquired from the radar sensor, that the distance between the person and the smart thermostat is equal to or less than the predetermined distance; and in response to determining that the distance between the person and the smart thermostat is equal to or less than the predetermined distance, restarting the timer.

In some embodiments, a method includes, while in the brightness lock mode, starting a timer for measuring a predetermined period of time; determining that the predetermined period of time has not elapsed; in response to determining that the predetermined period of time has not elapsed, determining whether or not the person has operated the smart thermostat.

In some embodiments, a method includes, while in the brightness lock mode, starting a timer for measuring a predetermined period of time; determining that the predetermined period of time has elapsed; in response to determining that the predetermined period of time has elapsed, ending the brightness lock mode and causing the content to be displayed on the display at a third brightness level.

In some embodiments, the content is first content that includes an ambient temperature of the environment surrounding the smart thermostat, and starting the brightness lock mode causes second content to be displayed at the second brightness level, wherein the second content includes a temperature set point of an air management system in communication with the smart thermostat.

Some embodiments include one or more non-transitory computer-readable media storing instructions which, when executed by a processing system including one or more processors, cause a smart thermostat to perform part or all of the operations and/or methods disclosed herein.

The techniques described above and below may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1A:
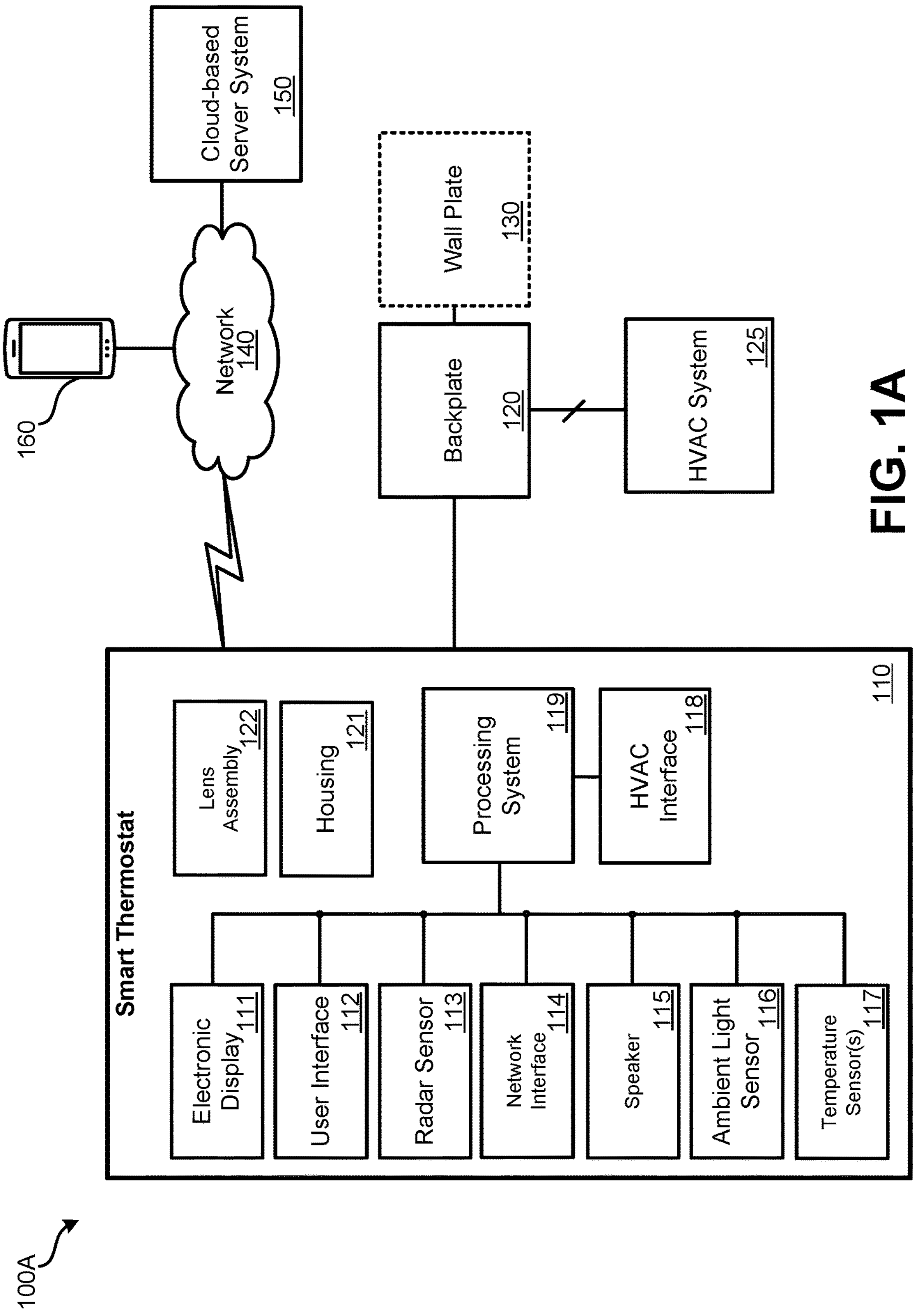
FIG. 1A is a block diagram of a smart thermostat system, according to some implementations of the present disclosure.

Thermostats that communicate via a network and allow end users to interact with a heating, ventilation, and air conditioning system (referred to herein as "HVAC system," "HVAC systems," "air handling system," and "air management system") from remote locations have become prevalent. Typically, an end user will use a control application that is executing on an electronic device such as a mobile phone to connect with and operate the thermostat and/or HVAC system. Such thermostats often include advanced features such as Internet or Wi-Fi connectivity, occupancy detection, home/away/vacation modes, indoor climate sensing, outdoor climate sensing, notifications, display of current weather conditions, learning modes, and others. Thermostats such as the foregoing and others can be referred to as smart thermostats.

Smart thermostats often include display brightness control mechanisms that dynamically adjust display brightness to, among other things, increase legibility of the content displayed. In some cases, the brightness level of the display is adjusted based on ambient light levels (i.e., the light levels of the natural and/or artificial light in the environment surrounding the smart thermostat). Operation of these smart thermostats is often effectuated by end users physically contacting these smart thermostats. For example, a smart thermostat may include buttons, switches, a touch screen, knobs, and the like which enable end users to set temperatures, control schedules, change settings, and the like. However, in cases where the brightness level of the display of the smart thermostat is adjusted based on ambient light levels, shadows cast over the smart thermostat by the end user (e.g., by their body, head, arms, and hands) can interfere with the display brightness control mechanism and cause content to be displayed too bright or dim. Knowledgeable end users can attempt to avoid such interference by manipulating their bodies, heads, arms, and hands so as to not cast a shadow over the smart thermostat, but often the end user is required to adjust their bodies, heads, arms, and hands in such a way that it causes inconvenience and discomfort to the end users. In many cases, these end users end up viewing the content displayed at less-than-optimal viewing positions.

One approach for addressing this challenge is to average the ambient light levels measured by the light sensor and use the average ambient light levels to adjust the display brightness level. Using this approach, transient changes in ambient light levels can be filtered out. However, using this approach, there is often a tradeoff between brightness control response time and the size of the transient changes in ambient light levels that are filtered out. Another approach for addressing this challenge is by fixing the brightness level once an end user has interacted with the smart thermostat. Using this approach, once the end user has interacted with the smart thermostat, changes in ambient light levels are ignored. However, using this approach, brightness levels can be fixed based on shadows cast by the end user even before the end user interacts with the smart thermostat. As such, content may be dimly displayed even in cases when the end user does not cast a shadow over the smart thermostat.

The features and techniques described herein overcome the foregoing challenges and others by providing an intelligent brightness lock for a smart thermostat. The developed approach begins measuring, using an ambient light sensor of the smart thermostat, ambient light level values of an environment surrounding the smart thermostat and displaying, on the display of the smart thermostat, content at a first brightness level. Radar data can be acquired from the radar sensor of the smart thermostat and a distance between a person and the smart thermostat can be determined based on the radar data. In the case the distance between the person and the smart thermostat is less than a predetermined distance, a brightness lock mode can be started, which can cause the content to be displayed on the display at a second brightness level that is equal to or greater than the first brightness level. When the brightness lock mode is started, a maximum ambient light level value of the measured ambient light level values within a time window prior to starting the brightness lock mode can be determined and used extract an intermediate brightness level from the brightness curve. The second brightness level can then be determined based on the intermediate brightness level. While in the brightness lock mode, a timer for measuring a predetermined period of time can be started. In the case the person operates the smart thermostat while in the brightness lock mode, the timer can be restarted. Similarly, in the case the distance between the person and the smart thermostat is equal to or less than the predetermined distance while in the brightness lock mode, timer can restart. In the case the predetermined period of time elapses, the brightness lock mode is ended and the content to be displayed on the display at the first brightness level or another brightness level. The content displayed at the second brightness level can be the same as or different from the content displayed the first brightness level. For example, an ambient temperature of the environment surrounding the smart thermostat can be displayed at the first brightness level, and, upon starting the brightness lock mode, the ambient temperature and a temperature set point of an air management system in communication with the smart thermostat can be displayed at the second brightness level. Other features and advantages are apparent within following descriptions.

FIG. 1A is a block diagram of an embodiment of a smart thermostat system. Smart thermostat system 100A can include smart thermostat 110; backplate 120; HVAC system 12; wall plate 130; network 140; cloud-based server system 150; and computerized device 160. Smart thermostat 110 represents embodiments of thermostats detailed herein. Smart thermostat 110 can include: electronic display 111; user interface 112; radar sensor 113; network interface 114; speaker 115; ambient light sensor 116; one or more temperature sensors 117; HVAC interface 118; processing system 119; housing 121; and lens assembly 122.

Electronic display 111 may be visible through the lens assembly 122. In some embodiments, electronic display 111 is only visible when electronic display 111 is at least partially illuminated. In some embodiments, electronic display 111 is not a touch screen which can allow the electronic display 111 to serve as a user interface to receive input. If a touch sensor, the electronic display 111 may allow one or more gestures, including tap and swipe gestures, to be detected.

User interface 112 can be various forms of input devices through which a user can provide input to smart thermostat 110. In some embodiments herein, an outer rotatable ring is present as part of user interface 112. The ring can be rotated by a user clockwise and counterclockwise in order to provide input. The ring can be infinitely rotatable in either direction, thus allowing a user to scroll or otherwise navigate user interface menus. The ring (and, possibly, lens assembly 122) can be pressed inward (toward the rear of smart thermostat 110) to function as a "click" or to make a selection. The outer rotatable ring can, for example, allow the user to make temperature target adjustments. By rotating the outer ring clockwise, the target temperature can be increased, and by rotating the outer ring counterclockwise, the target temperature can be decreased. As another example, the ring can be rotated to highlight displayed icons; an inward click can be provided by a user to select a particular icon.

Radar sensor 113 may be a single integrated circuit (IC) that can emit radio waves, receive reflected radio waves, and output radar data indicative of the received reflected radio waves. Radar sensor 113 may be configured to output radio waves into the ambient environment in front of electronic display 111 of the smart thermostat 110. The radar sensor 113 may emit radio waves and receive reflected radio waves through the lens assembly 122. The radar sensor 113 may include one or more antennas, one or more radio frequency (RF) emitters, and one or more RF receivers. The radar sensor 113 may be configured to operate as frequency-modulated continuous wave (FMCW) radar. The radar sensor 113 may emit chirps of radar that sweep from a first frequency to a second frequency (e.g., in the form of a saw tooth waveform). Using receive-side beam-steering (e.g., using multiple receiving antennas), certain regions may be targeted for sensing the presence of objects and/or people. The output of the radar sensor 113, which can be a radar data stream, may be analyzed using the processing system 119. The radar sensor 113 and the processing system 119 may be referred to hereinafter as radar subsystem. Further detail regarding the radar subsystem is provided in relation to FIG. 1B.

Network interface 114 may be used to communicate with one or more wired or wireless networks. Network interface 114 may communicate with a wireless local area network, such as a Wi-Fi network. Additional or alternative network interfaces may also be present. For example, smart thermostat 110 may be able to communicate with a user device directly, such as using Bluetooth or some other device-to-device short-range wireless communication protocol. Smart thermostat 110 may be able to communicate via a mesh network with various other home automation devices such as using Thread or Matter. Mesh networks may use relatively less power compared to wireless local area network-based communication, such as Wi-Fi. In some embodiments, smart thermostat 110 can serve as an edge router that translates communications between a mesh network and a wireless local area network, such as a Wi-Fi network. In some embodiments, a wired network interface may be present, such as to allow communication with a local area network (LAN). One or more direct wireless communication interfaces may also be present, such as to enable direct communication with a remote temperature sensor installed in a different housing external and distinct from housing 121. The evolution of wireless communication to fifth generation (5G) and sixth generation (6G) standards and technologies provides greater throughput with lower latency which enhances mobile broadband services. 5G and 6G technologies also provide new classes of services, over control and data channels, for vehicular networking (V2X), fixed wireless broadband, and the Internet of Things (IoT). Smart thermostat 110 may include one or more wireless interfaces that can communicate using 5G and/or 6G networks.

Speaker 115 can be used to output audio. Speaker 115 may be used to output beeps, clicks, synthesized speech, or other audible sounds, such as in response to the detection of user input via user interface 112.

Ambient light sensor 116 may sense the amount of light present in the environment of smart thermostat 110. Measurements made by ambient light sensor 116 may be used to adjust the brightness of electronic display 111. In some embodiments, ambient light sensor 116 senses an amount of ambient light through lens assembly 122. Therefore, compensation for the reflectivity of lens assembly 122 may be made such that the ambient light levels are correctly determined via ambient light sensor 116. In some implementations, a light pipe is present between ambient light sensor 116 and lens assembly 122 such that, in a particular region of lens assembly 122, light that is transmitted through lens assembly 122, is directed to ambient light sensor 116, which may be mounted to a printed circuit board (PCB), such as a PCB to which processing system 119 is attached.

One or more temperature sensors 117, may be present within smart thermostat 110. The one or more temperature sensors 117 may be used to measure the ambient temperature in the environment of smart thermostat 110. One or more additional temperature sensors that are remote from smart thermostat 110 may additionally or alternatively be used to measure the temperature of the ambient environment.

Lens assembly 122 may have a transmissivity sufficient to allow illuminated portions of electronic display 111 to be viewed through lens assembly 122 from an exterior of smart thermostat 110 by a user. Lens assembly 122 may have a reflectivity sufficient such that portions of lens assembly 122 that are not illuminated from behind appear to have a mirrored effect to a user viewing a front of smart thermostat 110. Further detail regarding the lens assembly 122 are provided in relation to FIGS. 4-7.

HVAC interface 118 can include one or more interfaces that control whether a circuit involving various HVAC control wires that are connected either directly with smart thermostat 110 or with backplate 120 is completed. A heating system (e.g., furnace, boiler, heat pump), cooling system (e.g., air conditioner, heat pump), fan, or some combination thereof may be controlled via HVAC wires by opening and closing circuits that include the HVAC control wires. In some installations, one a heating system or cooling system is controlled by the smart thermostat 110; in other embodiments, the smart thermostat 110 may control both a heating system and a cooling system.

Processing system 119 can include one or more processors. Processing system 119 may include one or more special-purpose or general-purpose processors. Such special-purpose processors may include processors that are specifically designed to perform the functions detailed herein. Such special-purpose processors may be ASICs or FPGAs which are general-purpose components that are physically and electrically configured to perform the functions detailed herein. Such general-purpose processors may execute special-purpose software that is stored using one or more non-transitory processor-readable mediums, such as random access memory (RAM), flash memory, a hard disk drive (HDD), or a solid state drive (SSD) of smart thermostat 110.

Processing system 119 may output information for presentation to electronic display 111. Processing system 119 can receive information from the one or more temperature sensors 117, user interface 112, radar sensor 113, network interface 114, and ambient light sensor 116. Processing system 119 can perform bidirectional communication with network interface 114. Processing system 119 can output information to be output as sound to speaker 115. Processing system 119 can control the HVAC system 125 via HVAC interface 118.

Housing 121 may house and/or attach with all of the components of smart thermostat 110, either directly or via other components. For example, lens assembly 122 may adhere to the electronic display 111, which is attached with housing 121.

The smart thermostat 110 may be attached (and removed) from backplate 120. Some number of HVAC control wires may be attached with terminals or receptacles of backplate 120. Such HVAC control wires electrically connect backplate 120 with the HVAC system 125, which can include a heating system, cooling system, ventilation system, or some combination thereof. Backplate 120 can allow the smart thermostat 110 to be attached and removed from backplate 120 without affecting the electronic connections of the HVAC control wires with backplate 120. In other embodiments, such control wires are directly connected with smart thermostat 110. In some embodiments, wall plate 130 may additionally be installed between backplate 120 and a surface, such as a wall, such as for aesthetic reasons (e.g., cover an unsightly hole through which HVAC wires protrude from the wall).

Network 140 can include one or more wireless networks, wired networks, public networks, private networks, and/or mesh networks. A home wireless local area network (e.g., a Wi-Fi network) may be part of network 140. Network 140 can include the Internet. Network 140 can include a mesh network, which may include one or more other smart home devices, may be used to enable smart thermostat 110 to communicate with another network, such as a Wi-Fi network. Smart thermostat 110 may function as an edge router that translates communications from a relatively low power mesh network received from other devices to another form of network, such as a relatively higher power network, such as a Wi-Fi network.

Cloud-based server system 150 can maintain an account mapped to smart thermostat 110. Smart thermostat 110 may periodically or intermittently communicate with cloud-based server system 150 to determine whether setpoint or schedule changes have been made. A user may interact with smart thermostat 110 via computerized device 160, which may be a mobile device, smartphone, tablet computer, laptop computer, desktop computer, or some other form of computerized device that can communicate with cloud-based server system 150 via network 140 or can communicate directly with smart thermostat 110 (e.g., via Bluetooth or some other device-to-device communication protocol). A user can interact with an application executed on computerized device 160 to control or interact with smart thermostat 110.

Figure 1B:
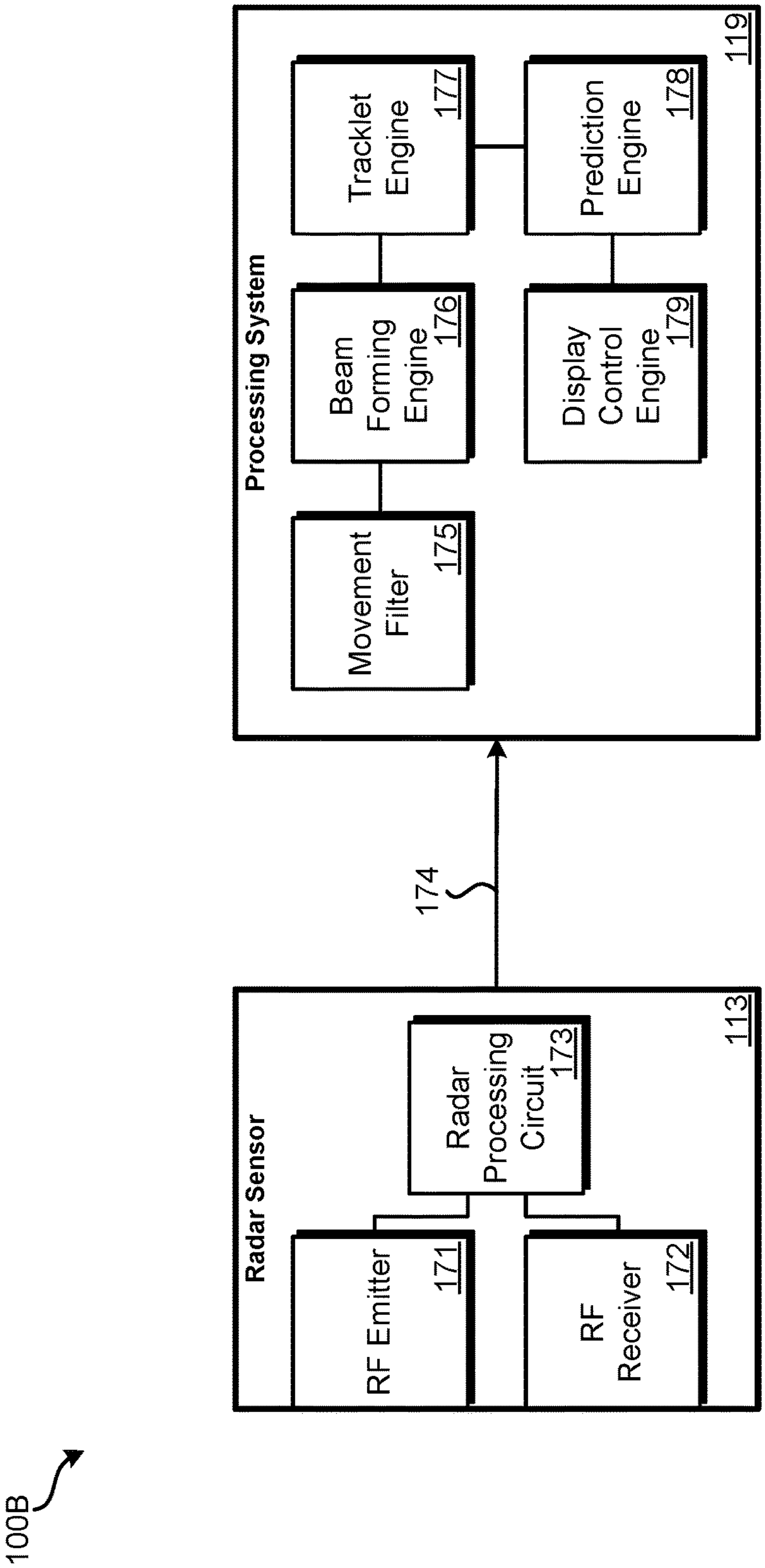
FIG. 1B is a block diagram of a radar subsystem of the smart thermostat system, according to some implementations of the present disclosure.

FIG. 1B is a block diagram of a radar subsystem 100B of the smart thermostat system 100A. As shown in FIG. 1B, the radar subsystem 100B includes the radar sensor 113 and the processing system 119. The radar sensor 113 may include RF emitter 171, RF receiver 172, and radar processing circuit 173. The RF emitter 171 can operate as a continuous-wave (CW) radar and may emit FMCW radar waves.

The radar sensor 113 may operate in a burst mode or continuous sparse-sampling mode. In burst mode, a frame or burst of multiple chirps, with the chirps spaced by a relatively short period of time, may be output by the RF emitter 171. Each frame may be followed by a relatively long amount of time until a subsequent frame. In a continuous sparse-sampling mode, frames or bursts of chirps are not output, rather chirps are output periodically. The spacing of chirps in the continuous sparse sampling mode may be greater in duration than the spacing between chirps within a frame of the burst mode. In some implementations, the radar sensor 113 may operate in a burst mode but raw chirp radar data for each burst may be combined (e.g., averaged) together to create simulated continuous sparse-sampled chirp radar data. In some implementations, radar data gathered in burst mode may be preferable for movement detection while radar data gathered in a continuous sparse-sampling mode may be preferable for static monitoring.

The RF emitter 171 may include one or more antennas and may transmit at or about 60 gigahertz (GHz). The frequency of radio waves transmitted may repeatedly sweep from a low to high frequency (or the reverse). The power level used for transmission may be very low such that radar subsystem 100B has an effective range of several meters or an even shorter distance. Further detail regarding the radio waves generated and emitted by the radar subsystem 100B are provided in relation to FIG. 1C.

The RF receiver 172 includes one or more antennas, distinct from the transmit antenna(s), and may receive radio wave reflections off of objects in the environment surrounding the smart thermostat 110 of radio waves emitted by the RF emitter 171. The reflected radio waves may be interpreted by radar processing circuit 173 by mixing the radio waves being transmitted with the reflected received radio waves, thereby producing a mixed signal that can be analyzed for distance. Based on this mixed signal, the radar processing circuit 173 may output a radar data stream 174.

The radar sensor 113 may be implemented as a single IC or radar processing circuit 173 may be a separate component from the RF emitter 171 and the RF receiver 172. In some implementations, the radar sensor 113 is integrated as part of the smart thermostat 110 such that the RF emitter 171 and the RF receiver 172 are pointing in a same direction as electronic display 111. In other implementations, an external device that includes the radar sensor 113 may be connected with the smart thermostat 110 via wired or wireless communication. For example, the radar sensor 113 may be an add-on device to the smart thermostat 110.

The radar data stream 174 may include raw radar waveform data that is indicative of continuous sparse reflected chirps due to the radar sensor 113 operating in a continuous sparse sampling mode or due to the radar sensor 113 operating in a burst mode and a conversion process can be performed to simulate raw waveform data produced by the radar senor 113 operating in a continuous sparse sampling mode. Processing may be performed to convert burst sampled waveform data to continuous sparse samples using an averaging process, such as each reflected group of burst radio waves being represented by a single averaged sample.

The processing system 119 includes movement filter 175, beam forming engine 176, tracklet engine 177, prediction engine 178, and display control engine 179. Each of the components of the processing system 119 may be implemented using software, firmware, or as specialized hardware. The radar data of the radar data stream 174 that is received for each antenna of the RF receiver 172 may first be processed using the movement filter 175. The movement filter 175 may be used to separate static background radar reflections from moving objects. As such, radar reflections due to static objects can be filtered out and discarded. The movement filter 175 may buffer the radar data of the radar data stream 174 for each antenna for a rolling time window, such as between one and five seconds. Since static objects can be expected to produce the same radar reflections repeatedly, an adaptive background subtraction process may be performed for sets of the radar data stream 174. The output from the movement filter 175 may be foreground radar data for each antenna. Data included in the foreground radar data corresponds to only radar reflections from objects that have moved during the rolling time window.

The output foreground radar data for which a set of foreground radar data corresponds to each antenna may be passed to the beam forming engine 176. The beam forming engine 176 may be used to determine the angle and distance to an object in motion that reflected radar. Beam forming may be performed by comparing differences in the time at which the radar reflections were received. Multiple three-dimensional fast Fourier transforms (FFTs) may be performed to produce heat map projections. To perform the beam forming, radar data from two channels (e.g., two antennae) are stacked to create a three-dimensional data block. Two combinations may be performed (e.g., radar data from a first antenna and a second antenna, and radar data from a second antenna and a third antenna if there are three receivers or one set of radar data from one set of linearly arranged antennas and another set of radar data from another set of linearly arranged antennas where the two sets of antennas do not form parallel lines). Therefore, two three-dimensional data blocks may now be present. A FFT may be performed on each of the three-dimensional data blocks. Zero padding may be used to improve output data quality. Data may be summed (or marginalized) over one of the dimensions to create two two-dimensional data sets. The result is intensity data indicated in the heat map projections. In an alternative embodiment of beam forming, rather than creating three-dimensional data then marginalizing, two-dimensional data may be created from the start. For such an implementation, radar data may not be initially stacked, thus resulting in two-dimensional data being directly obtained.

Each heat map projection may be indicative of an amount of reflected radio waves, a range to the object that reflected the radio waves, and an angle from an antenna array to the object that reflected the radio waves. Therefore, for example, a first heat map may be produced that indicates the range and the azimuthal angle to the object that reflected radio waves and a second heat map may be produced that indicates the range and elevational angle to the object that reflect radio waves.

The heat map projection created by the beam forming engine 176 may be output to the tracklet engine 177. The tracklet engine 177 may combine information from the multiple heat map projections produced by the beam forming engine 176 to track a center-of-mass of an object. The center-of-mass can be extracted using an average location of the brightest intensity points in the heat map projections. In some implementations, a process called non-maximum suppression (NMS) is used. If clustered high intensity points are smaller than a defined size threshold, the points may be discarded as being related to too small of an object to be a person. For instance, a moving object may be a clock pendulum. Since such movement is unrelated to a person, it may be desirable to suppress or otherwise remove movement attributed to such nonperson objects.

The tracklet engine 177 may represent an identified moving object, which is expected to be a person, as a single center-of-mass as obtained from the averaging or NMS process. Therefore, a single point can be used to represent an entire person with the single point being located in space at or near the center-of-mass of the person. The center-of-mass tracking may be performed by the tracklet engine 177 by applying non-maximum suppression (NMS) and, possibly, an unscented Kalman filter (UKF). It should be understood that in other embodiments, different forms of filtering may be performed by tracklet engine 177. The output of tracklet engine 177 may be a three-dimensional map of the movement of a center-of-mass represented as a vector over a historic window of time, such as five or ten seconds. Use of a three-dimensional map may be particularly important to sense that a person may be moving towards or away from the smart thermostat 110 and/or may be moving laterally with respect to the smart thermostat 110. The tracklet map of the movement of the center-of-mass over the historic time window may be output to the prediction engine 178.

The prediction engine 178 can be configured to make one or more predictions for one or more persons located within the environment of the smart thermostat 110. In some implementations, the prediction engine 178 can be configured to receive the tracklet map and process the tracklet map to make one or more predictions for one or more persons located within the environment. The prediction engine 178 can be configured to make the one or more predictions in a privacy-preserving fashion (i.e., without identifying any individual person).

In some implementations, the one or more predictions can include detecting persons within the environment surrounding the smart thermostat 110 (e.g., within a predetermined angle of view and a predetermined range), identifying one or more locations within the environment where those persons are located and/or have been located (e.g., in the case of a moving person, where they were located at a first time and where they are located at a second time after the first time), and determining a distance between each person and the smart thermostat 110 at each of those locations. In some implementations, there may be multiple people within the environment surrounding the smart thermostat. In this case, in some implementations, the prediction engine 178 can predict which person among the people is closest to the smart thermostat 110.

In some implementations, the one or more predictions can include recognizing a direction in which a person located within the environment is facing (e.g., facing toward the electronic display 111 of the smart thermostat 110, facing away from the electronic display 111 of the smart thermostat, etc.) and/or a viewing angle in which a person located within the environment is viewing the electronic display 111 of the smart thermostat (e.g., a person is viewing the electronic display 111 at a 30 degree angle with respect to a central axis that passes through an origin of the display).

In some implementations, the one or more predictions can include recognizing gestures performed by a person located within the environment. As used herein, a gesture refers to a movement of a portion of a person's body (e.g., head, face, body, limbs, hands, etc.). For example, the prediction engine 178 can recognize that a person that turned their head from a neutral position with respect to and/or facing away from the electronic display 111 of the smart thermostat 110 to a position in which their face is oriented towards the electronic display 111 of the smart thermostat 110. In another example, the prediction engine 178 can recognize that a person changed an angle at which they are viewing the electronic display 111 of the smart thermostat 110.

The prediction engine 178 can include one or more machine learning models. In some implementations, the prediction engine 178 can include a separate machine learning model for each prediction. For example, a machine learning model can be included for tracking persons located within the environment surrounding the smart thermostat 110 and a machine learning model can be included for recognizing gestures performed by those persons. In other implementations, the prediction engine 178 can include a single machine learning model that is configured to make multiple predictions. Each machine learning model included in the prediction engine 178 can be a pre-trained model and include any suitable architecture for making predictions based on radar data (e.g., a neural network-based machine learning model). Additionally, or alternatively, separate machine learning models may be used depending on the type of location where the smart thermostat 110 is to be placed. For instance, different machine learning models, that are trained separately, use different weightings, and/or different types of machine learning (e.g., a neural network) may be used based on the type of installation location. In some implementations, the machine learning model may be dynamic in that it can learn about situations that involved and after being installed in the environment in which the smart thermostat 110 will function.

The prediction engine 178 may be configured to analyze some number of features of the movement of the center-of-mass over the historic window of time. For example, in some implementations, more than four features of the movement of the center-of-mass over the historic window of time may be analyzed according to a pre-defined weighting by the one or more machine learning models. In some implementation, between three and twenty features, such as sixteen features of the center-of-mass may be analyzed by the pre-trained machine learning model. For example, these features can include initial azimuthal position; final azimuthal position; azimuthal position change; azimuthal slope; initial elevational position; final elevational position; elevational position change; elevational slope; initial range position; final range position; range position change; range slope; initial RCS (radar cross section) position; final RCS position; RCS position change; RCS slope; and velocity. An "initial" position refers to the position at the beginning of the historic time window, a "final" position refers to the position at the end of the historic time window, a "change" position refers to the amount of change that has occurred in position in the specified direction over the historic time window; and "slope" refers to the rate of change in position in the specified direction over the historic time window. "Range" refers to position relative to a distance from the smart thermostat 110.

For the above features, it may be possible that individual features are analyzed over varying time windows. For instance, RCS features may be analyzed over a longer time window than azimuthal features. Each of these features may be assigned different weights as part of the pre-trained machine learning model based on the determined relative importance for correctly identifying a person falling. The weightings may be assigned based on a training process that was performed using a training set of data that included data indicative of a person moving, a gesture performed by the person (e.g., a head rotation of the person), and a face of the person. The training process may have involved creating a machine learning model that can classify movements/gestures accurately as possible. For instance, a training set of data that includes a large amount of data having a known classification (i.e., head facing one direction, head facing another direction) may be fed to a machine learning engine. The machine learning engine may create a machine learning model that accurately classifies as many of the movements/gestures as possible. Each machine learning model may be trained prior to being installed on the smart thermostat 110 such that each pre-trained machine learning model can be used on a large number of smart thermostats 110 being manufactured. Therefore, once installed on the processing system 119, each machine learning model of the prediction engine 178 may be static.

The outputs of the tracklet engine 177 and prediction engine 178 may be provided to the display control engine 179, which can be configured to control the electronic display 111 of the smart thermostat 110 based on the tracklet map and predictions made by the prediction engine 178. In some implementations, controlling the electronic display 111 includes changing a mode of the electronic display 111 (e.g., from off to a standby mode, from off to an active mode, from a standby mode to an active mode, and the reverse). In some implementations, controlling the electronic display 111 includes adjusting a display brightness level of the electronic display 111. In some implementations, controlling the electronic display 111 includes changing content that is displayed on the electronic display 111 (e.g., from first content to second content that is different from the first content). In some implementations, controlling the electronic display 111 includes adjusting a characteristic of content displayed on the display (e.g., changing a display brightness of the content, the content from first content to second content that is different from the first content, and/or a font feature of the content). In some implementations, the content that is displayed includes, but is not limited to, an ambient temperature of the environment surrounding the smart thermostat 110 and a temperature set point of an air handling system (e.g., HVAC system) that is in communication with the smart thermostat 110. Additional examples of how the display can be controlled based at least in part on radar data are described in further detail with respect to FIGS. 11-15.

Figure 1C:
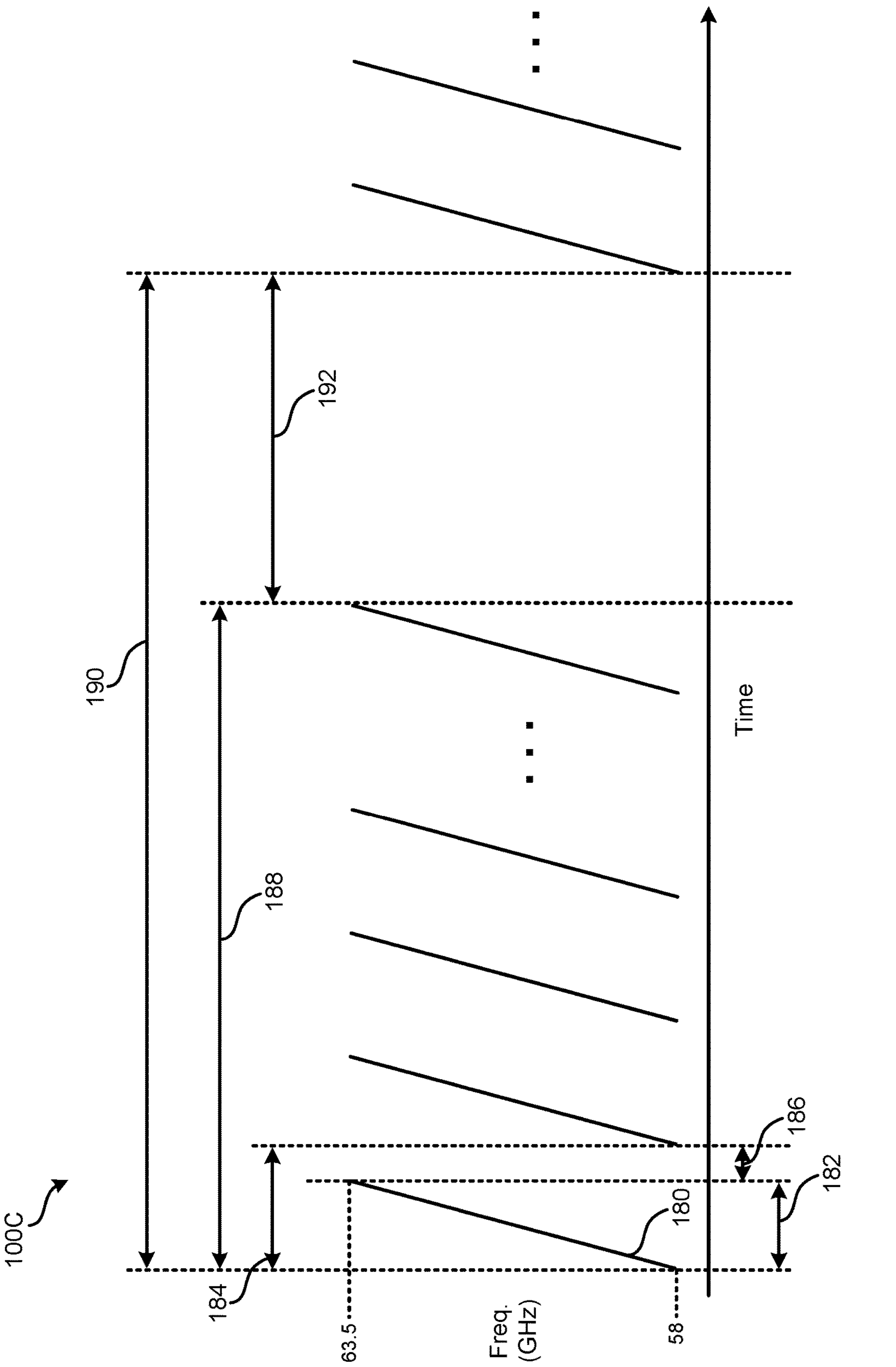
FIG. 1C is an embodiment of a chirp timing diagram for frequency modulated continuous wave radar radio waves output by the radar subsystem, according to some implementations of the present disclosure.

FIG. 1C is an embodiment of a chirp timing diagram 100C for FMCW radar radio waves output by the radar subsystem 100B. Chirp timing diagram 100C is not to scale. The radar subsystem 100B may generally output radar in the pattern of chirp timing diagram 100C. Chirp 180 represents a continuous pulse of radio waves that sweeps up in frequency from a low frequency to a high frequency. In other embodiments, individual chirps may continuously sweep down from a high frequency to a low frequency, from a low frequency to a high frequency, and back to a low frequency, or from a high frequency to a low frequency and back to a high frequency. In some embodiments, the low frequency is 58 GHz and the high frequency is 63.5 GHz. (For such frequencies, the radio waves may be referred to as millimeter waves.) In some embodiments, the frequencies are between 57 and 64 GHz. The low frequency and the high frequency may be varied by embodiment. For instance, the low frequency and the high frequency may be between 45 GHz and 80 GHz. The frequencies select may be selected at least in part to comply with governmental regulation. In some embodiments, each chirp includes a linear sweep from a low frequency to a high frequency (or the reverse). In other embodiments, an exponential or some other pattern may be used to sweep the frequency from low to high or high to low.

Chirp 180, which can be representative of all chirps in chirp timing diagram 100C, may have chirp duration 182 of 128 μs. In other embodiments, chirp duration 182 may be longer or shorter, such as between 50 μs and 1 ms. In some embodiments, a period of time may elapse before a subsequent chirp is emitted. Inter-chirp pause 186 may be 205.33 μs. In other embodiments, inter-chirp pause 186 may be longer or shorter, such as between 10 μs and 1 ms. In the illustrated embodiment, chirp period 184, which includes chirp 180 and inter-chirp pause 186, may be 333.33 μs. This duration varies based on the selected chirp duration 182 and inter-chirp pause 186.

A number of chirps that are output, separated by inter-chirp pauses may be referred to as frame 188 or frame 188. Frame 188 may include twenty chirps. In other embodiments, the number of chirps in frame 188 may be greater or fewer, such as between 1 and 100. The number of chirps present within frame 188 may be determined based upon an average amount of power that is desired to be output within a given period of time. The FCC or other regulatory agency may set a maximum amount of power that is permissible to be radiated into an environment. For example, a duty cycle requirement may be present that limits the duty cycle to less than 10% for any 33 ms time period. In one particular example in which there are twenty chirps per frame, each chirp can have a duration of 128 μs, and each frame being 33.33 ms in duration. The corresponding duty cycle is (20 frames)*(0.128 ms)/(33.33 ms), which is about 7.8%. By limiting the number of chirps within frame 188 prior to an inter-frame pause, the average output power may be limited. In some embodiments, the peak EIRP (effective isotropically radiated power) may be 13 dBm (20 mW) or less, such as 12.86 dBm (19.05 mW). In other embodiments, the peak EIRP is 15 dBm or less and the duty cycle is 15% or less. In some embodiments, the peak EIRP is 20 dBm or less. That is, at any given time, the average power radiated over a period of time by the radar subsystem might be limited to never exceed such values. Further, the total power radiated over a period of time may be limited. In some embodiments, a duty cycle may not be required.

Frames may be transmitted at a frequency of 30 Hz (33.33 ms) as shown by time period 190. In other embodiments, the frequency may be higher or lower. The frame frequency may be dependent on the number of chirps within a frame and the duration of inter-frame pause 192. For instance, the frequency may be between 1 Hz and 50 Hz. In some embodiments, chirps may be transmitted continuously, such that the radar subsystem outputs a continuous stream of chirps interspersed with inter-chirp pauses. Tradeoffs can be made to save on the average power consumed by the device due to transmitting chirps and processing received reflections of chirps. Inter-frame pause 192 represents a period of time when no chirps are output. In some embodiments, inter-frame pause 192 is significantly longer than the duration of frame 188. For example, frame 188 may be 6.66 ms in duration (with chirp period 254 being 333.33 μs and 20 chirps per frame). If 33.33 ms occur between frames, inter-frame pause 192 may be 26.66 ms. In other embodiments, the duration of inter-frame pause 192 may be larger or smaller, such as between 15 ms and 40 ms.

In the illustrated embodiment of FIG. 1C, a single frame 188 and the start of a subsequent frame are illustrated. It should be understood that each subsequent frame can be structured similarly to frame 188. Further, the transmission mode of the radar subsystem may be fixed. That is, regardless of whether a user is present or not, the time of day, or other factors, chirps may be transmitted according to chirp timing diagram 100C. Therefore, in some embodiments, the radar subsystem always operates in a single transmission mode, regardless of the state of the environment or the activity attempting to be monitored. A continuous train of frames similar to frame 188 may be transmitted while device 101 is powered on.

Figure 2A:
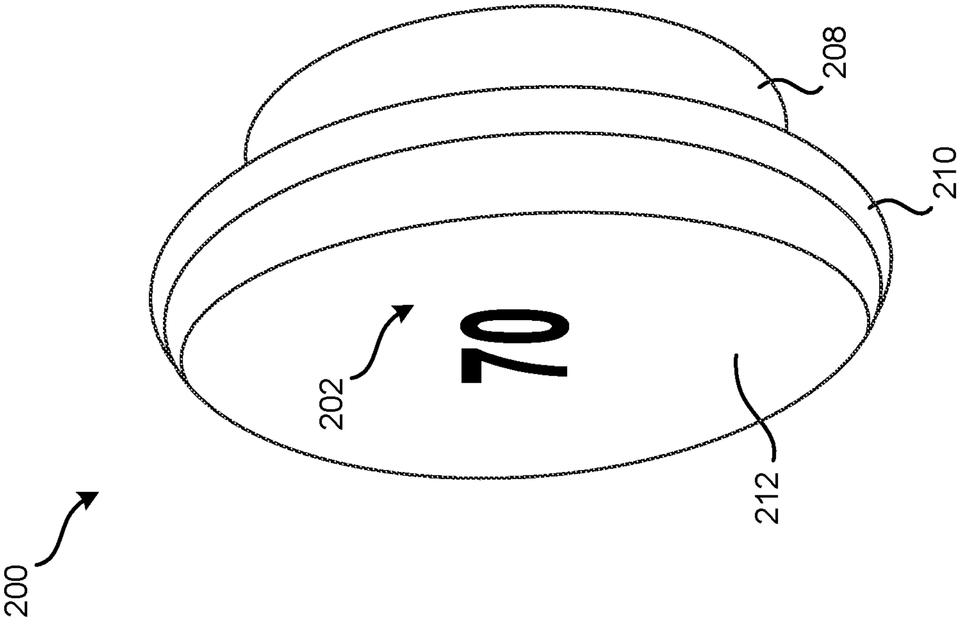
FIG. 2A is an isometric view of an embodiment of a smart thermostat, according to some implementations of the present disclosure.

FIG. 2A is an isometric view of an embodiment of a smart thermostat 200. Smart thermostat 200 can represent an embodiment of smart thermostat 110 of FIG. 1. In FIG. 2A, electronic display 202, located behind lens assembly 212, is active in displaying a setpoint temperature. The housing of smart thermostat 200 can define sidewall 208. Sidewall 208 may be generally cylindrical according to various embodiments. A diameter of the sidewall 208 may be smaller than a diameter of the electronic display 202 and ring 210 according to various embodiments and as illustrated in FIG. 2A. Ring 210 can function as detailed in relation to user interface 112. Either attached with housing 121 or attached with components connected with housing 121 is lens assembly 212. Lens assembly 212 may include a reflective layer having a reflectivity such that when the electronic display 202 is not illuminated, lens assembly 212 appears to be a mirror when viewed by a user.

In some embodiments, ring 210 is mounted to lens assembly 212. In other embodiments, ring 210 can be rotated clockwise and counterclockwise independent of lens assembly 212. In some embodiments, housing 121 includes a display frame (not visible in this view) that further supports electronic display 202 and lens assembly 212.

Electronic display 202 is housed behind lens assembly 212 such that, when illuminated, the portion of electronic display 202 that is illuminated is visible through lens assembly 212 by a user. In some embodiments, due to the reflectivity of lens assembly 212, an edge of electronic display 202 is not visible to a user regardless of whether electronic display 202 is illuminated, partially illuminated, or not illuminated. Therefore, the overall effect experienced by a user may be that lens assembly 212 appears as a mirror and portions of electronic display 202, when illuminated, are visible through lens assembly 212.

In various embodiments, around an axis perpendicular to the display face of electronic display 202, the ring 210 has an inner diameter and an outer diameter and both the inner diameter and the outer diameter of ring 210 are larger than a diameter of sidewall 208 of housing 121.

Figure 2C:
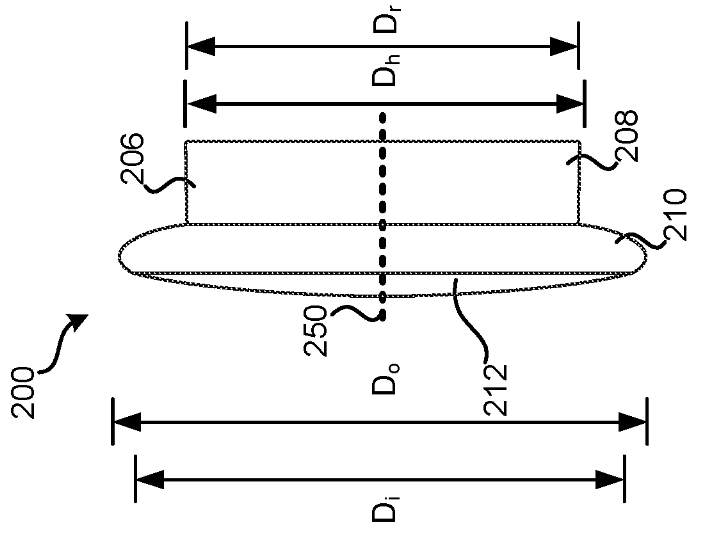
FIGS. 2B and 2C are a front view and a side view of an embodiment of a smart thermostat, according to some implementations of the present disclosure.
Figure 2B:
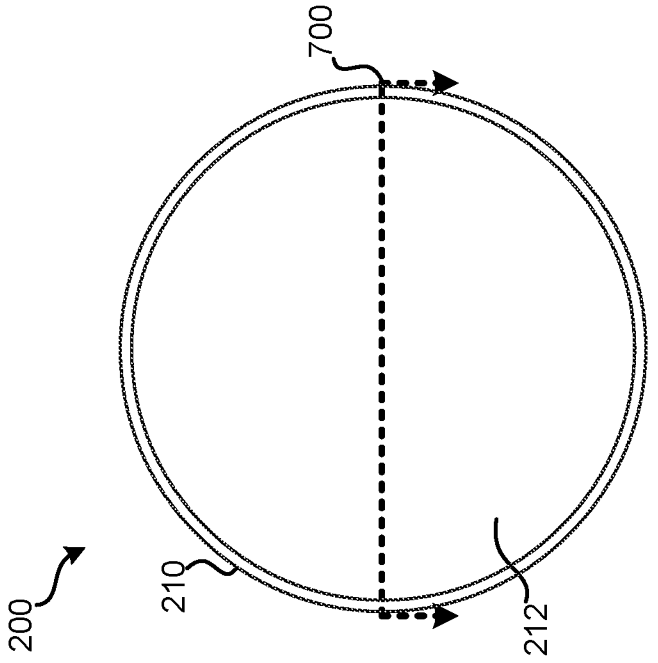

FIG. 2B is a front view of an embodiment of smart thermostat 200. When mounted on a wall or other surface, lens assembly 212 is opposite the portion of smart thermostat 200 that mounts to the wall or other surface. Therefore, when a user is facing mounted smart thermostat 200, lens assembly 212 is visible. Lens assembly 212 can form an uninterrupted circular surface with no gaps, holes, lens, or other discontinuities present on the outermost surface of lens assembly 212. Lens assembly 212 has sufficient transmissivity to allow light emitted by electronic display 202 located within housing 206 to be visible through lens assembly 212. Further, lens assembly 212 may have sufficient reflectivity such that a mirrored effect is present on portions of lens assembly 212 that are not currently being illuminated from behind by electronic display 202. Present in FIG. 2B is an indication of cross-section 700. Cross-section 700 is detailed in relation to FIG. 5.

FIG. 2C is a side view of an embodiment of a smart thermostat. When smart thermostat 200 is mounted to a wall or other surface, sidewall 208 of housing 121 is visible. Around an axis 250, the ring 210 has an inner diameter $D_i$ and an outer diameter $D_o$ and both the inner diameter $D_i$ and the outer diameter $D_o$ of the ring 210 are larger than a diameter $D_h$ of sidewall 208 of housing 121. According to various embodiments, sidewall 208 of housing 121 can be generally cylindrical and can have a consistent diameter along a length thereof. Alternatively, a diameter of sidewall 208 can increase as a distance from lens assembly 212 increase.

In some embodiments, ring 210 has a smallest diameter at the rearmost portion of ring 210. $D_r$ is indicative of the diameter of ring 210 where ring 210 meets sidewall 208. This arrangement can help facilitate a user's fingers reaching around ring 210, grasping ring 210, and rotating in either direction. In some embodiments, along axis 250, sidewall 208 may have a diameter of approximately $D_r$ wherein ring 210 and sidewall 208 meet. In some embodiments, the diameter of sidewall 208 can increase as the distance from ring 210 increases.

Figure 3:
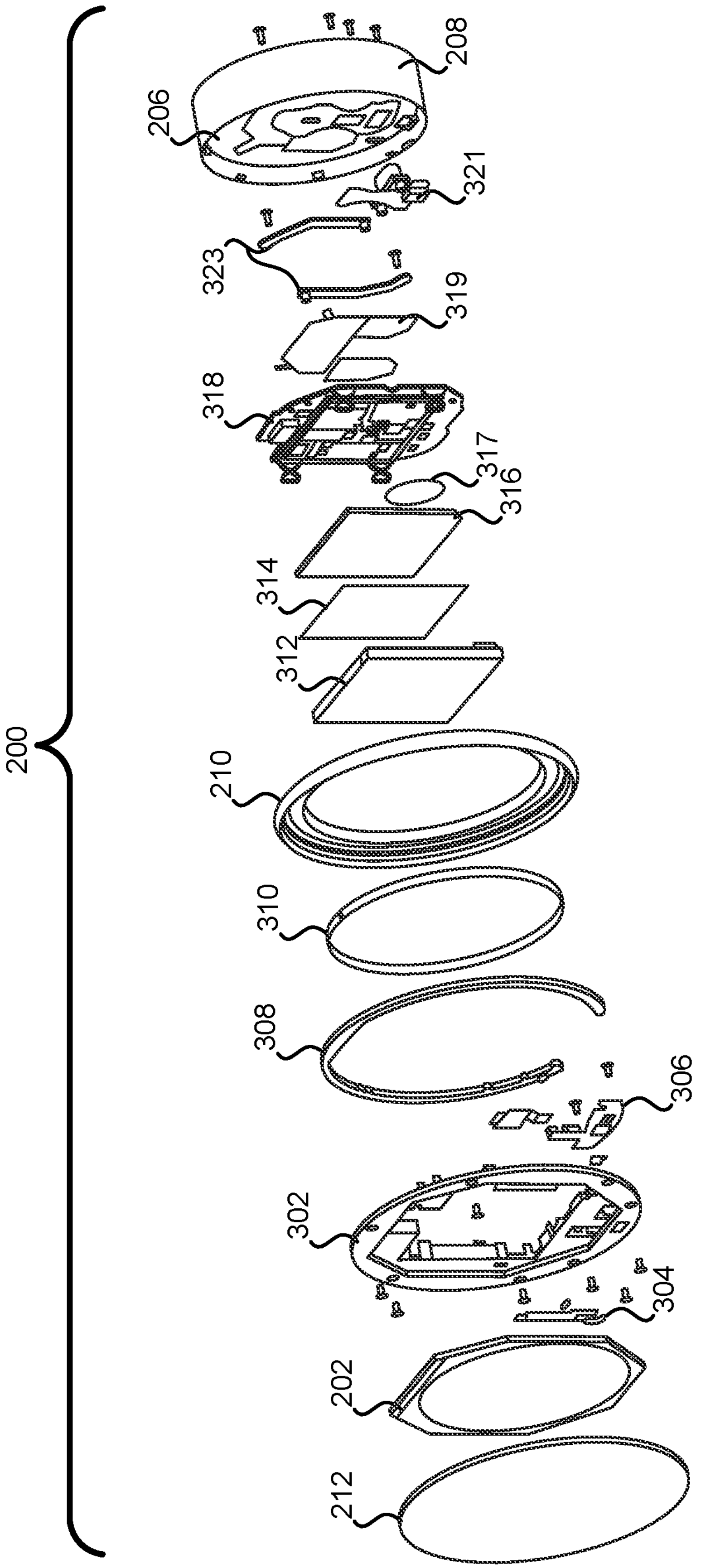
FIG. 3 is a front isometric view of an embodiment of a smart thermostat, according to some implementations of the present disclosure.
Figure 4:
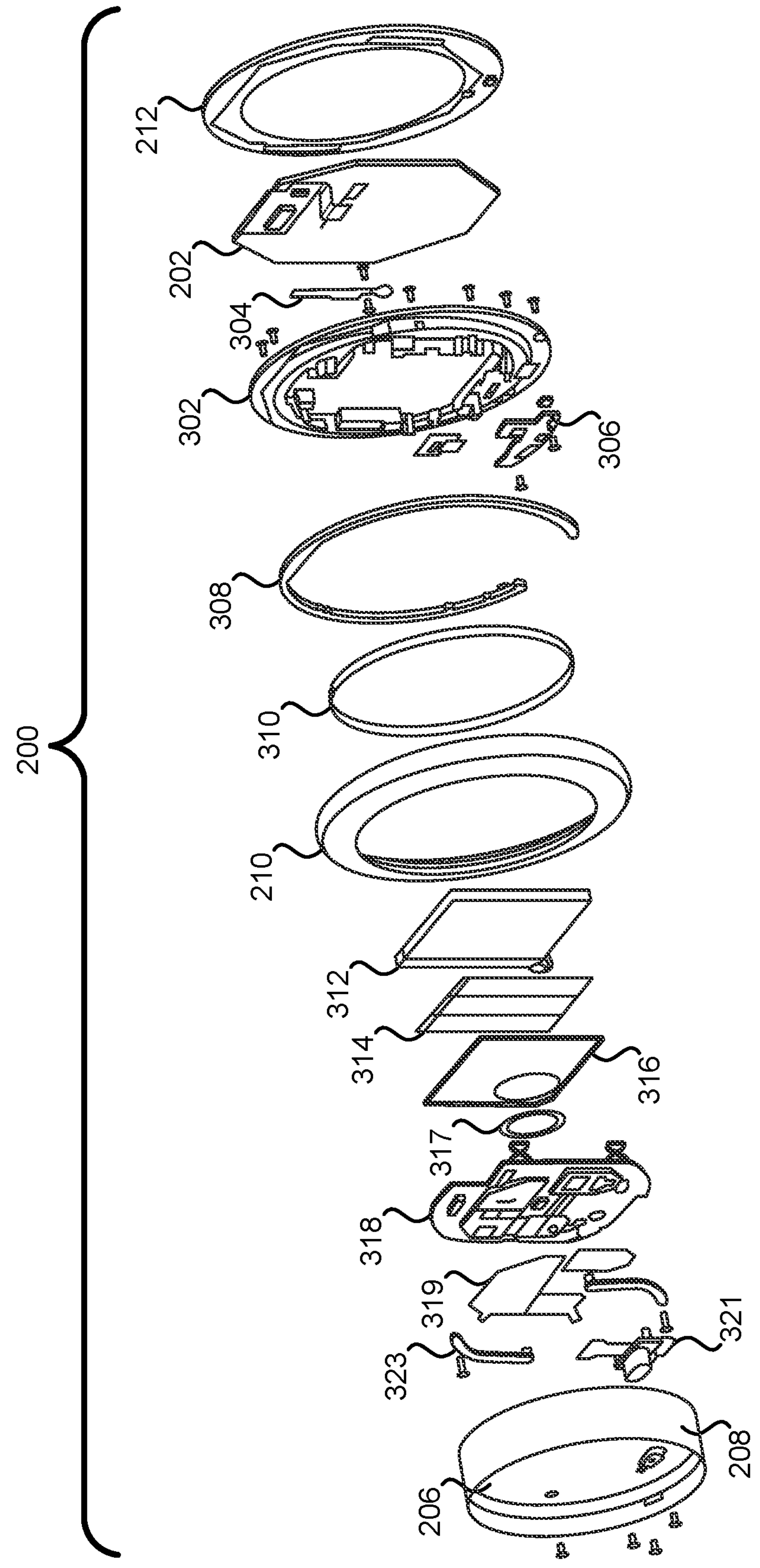
FIG. 4 is a rear isometric view of an embodiment of a smart thermostat, according to some implementations of the present disclosure.

FIG. 3 is an exploded front isometric view of an embodiment of smart thermostat 200. FIG. 4 is an exploded rear isometric view of smart thermostat 200. Viewing the components of the smart thermostat 200 left to right, lens assembly 212 forms an outermost domed surface of smart thermostat 200. Adjacent lens assembly 212 may be electronic display 202. Electronic display 202 may be a liquid-crystal display (LCD) or organic light emitting diode (OLED) display according to various embodiments. In at least some embodiments, one or more adhesives may be used to attach electronic display 202 with lens assembly 212. An exploded view of lens assembly 212 is provided in relation to FIG. 6.

According to at least some embodiments, electronic display 202 is supported by a display frame 302. Smart thermostat 200 further includes one or more antenna assemblies 304 for communicating with a network and/or other electronic devices. Antenna assembly 304 can be used for communicating with wireless local area networks (e.g., Wi-Fi), device-to-device communication (e.g., Bluetooth), and/or communicating with mesh networks (e.g., Thread). Smart thermostat 200 includes one or more sensor boards, such as sensor daughterboard 306. One or more temperature sensors may be installed on sensor daughterboard 306. Use of sensor daughterboard 306 can help isolate the one or more temperature sensors from heat generated by other components.

Smart thermostat 200 may further include clip 308 for coupling ring 210 and display frame 302 supporting electronic display 202. Clip 308 may act as an axial constraint for smart thermostat 200. In particular, clip 308 prevents electronic display 202, display frame 302, and ring 210 from decoupling from one another in the assembled configuration.

As shown in FIG. 3A, smart thermostat can include magnetic strip 310. According to various embodiments, ring 210 rotates relative to sidewall 208 of housing 206 and a backplate when smart thermostat 200 is mounted to a surface. In various embodiments, a sensor installed on a sensor board, such as sensor board 306 and magnetic strip 310 are used for detecting rotation of the ring 210 during use.

According to various embodiments, ring 210 is mounted to housing 206 such that ring 210 can be rotated clockwise and counterclockwise. Ring 210 may include polished stainless steel and a finish applied using physical vapor deposition (PVD). Ring 210 further advantageously provides an aesthetic appearance as the finish of the ring 210 appears seamless relative to lens assembly 212 having a mirrored effect.

Further internal components of smart thermostat 200 include battery 312 and battery adhesive 314. Battery 312 can be a secondary battery and can provide power to the various components of smart thermostat 200, including electronic display 202 and processing system 119. Battery adhesive 314 may be used to adhere battery 312 within housing 206 although the battery 312 (or any other components of the smart thermostat 200) may be secured within the housing 206 using other means. For example, various components may be secured using adhesives, screws, wires, clips, or the like.

Smart thermostat 200 includes processing system 316. According to some embodiments, processing system 316 is a system-on-a-chip (SoC) including various processing parts, memory, modems, etc. Processing system 316 may be in electric communication with one or more antennas present on antenna assembly 304, sensor board 306, electronic display 202, etc., for performing various functions of the smart thermostat 200 and outputting results based on user input (e.g., in response to the user rotating the ring 210 and/or user input via an external mobile device). Adjacent processing system 316 may be piezo sensor 317. Additional components of the processing system 316 or components that work with processing system 316 are also shown in FIG. 3. For example, multi-layer board (MLB) 318 may be provided for performing various functions of smart thermostat 200, in a manner that would be appreciated by one having ordinary skill in the art. In some embodiments, MLB 318 may include a Universal Serial Bus (USB) port for electrically coupling smart thermostat 200 to another electronic device for various updates, servicing, or the like. Various springs 319 for supporting components, flexes 321 for enabling flexible and high-density interconnects between printed circuit boards (PCBs), LCDs, etc., and additional links 323 may also be included in the internal components of smart thermostat 200.

Smart thermostat 200 may include more or fewer components than those shown in FIG. 3 and FIG. 4. In various embodiments, the components may be in one or more configurations other than the configuration shown in FIG. 3. Advantageously, various components of smart thermostat 200 are optimized to be condensed into housing 206 such that the overall side profile of smart thermostat 200 is significantly thinner than a side profile of other commercially available smart thermostats.

Figure 5B:
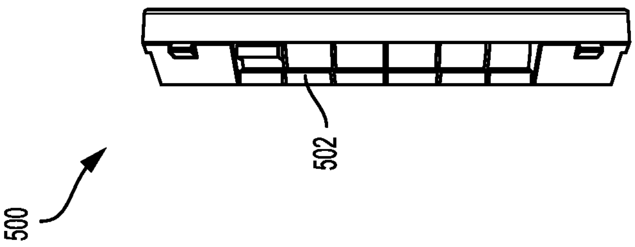
FIGS. 5A and 5B are a front view and a side view of an embodiment of a backplate for a smart thermostat, according to some implementations of the present disclosure.
Figure 5A:
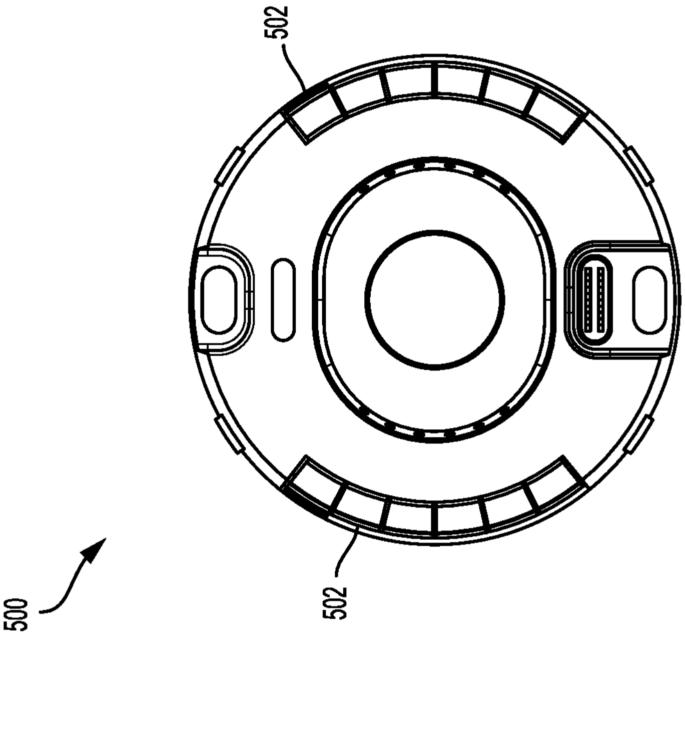

FIGS. 5A and 5B are a front view and a side view of a smart thermostat backplate. According to various embodiments, an electronic device, such as smart thermostat 200 described in detail above, may be mounted to a wall or other surface by a backplate 500. The backplate 500 may include a plurality of wire terminals 502 for receiving wires that are connected with a heating, ventilation, and cooling (HVAC) system. For example, the backplate 500 may include multiple receptacles, with each receptacle designated to receive a particular HVAC control wire. Backplate 500 can define one or more holes configured to receive fasteners or the like for securing backplate 500 and, if being used, a trim plate or the like, to a surface, such as a wall. The backplate 500 can removably attached with the thermostat housing, such as thermostat housing 206 described above.

In some embodiments, a smart thermostat may be attached (and removed) from backplate 500. HVAC control wires may be attached with terminals or receptacles of backplate 500. Alternatively, such control wires may be directly connected with the smart thermostat. In some embodiments, a trim plate may additionally be installed between the backplate 500 and a surface, such as a wall, such as for aesthetic reasons (e.g., cover an unsightly hole through which HVAC wires protrude from the wall).

Figure 5C:
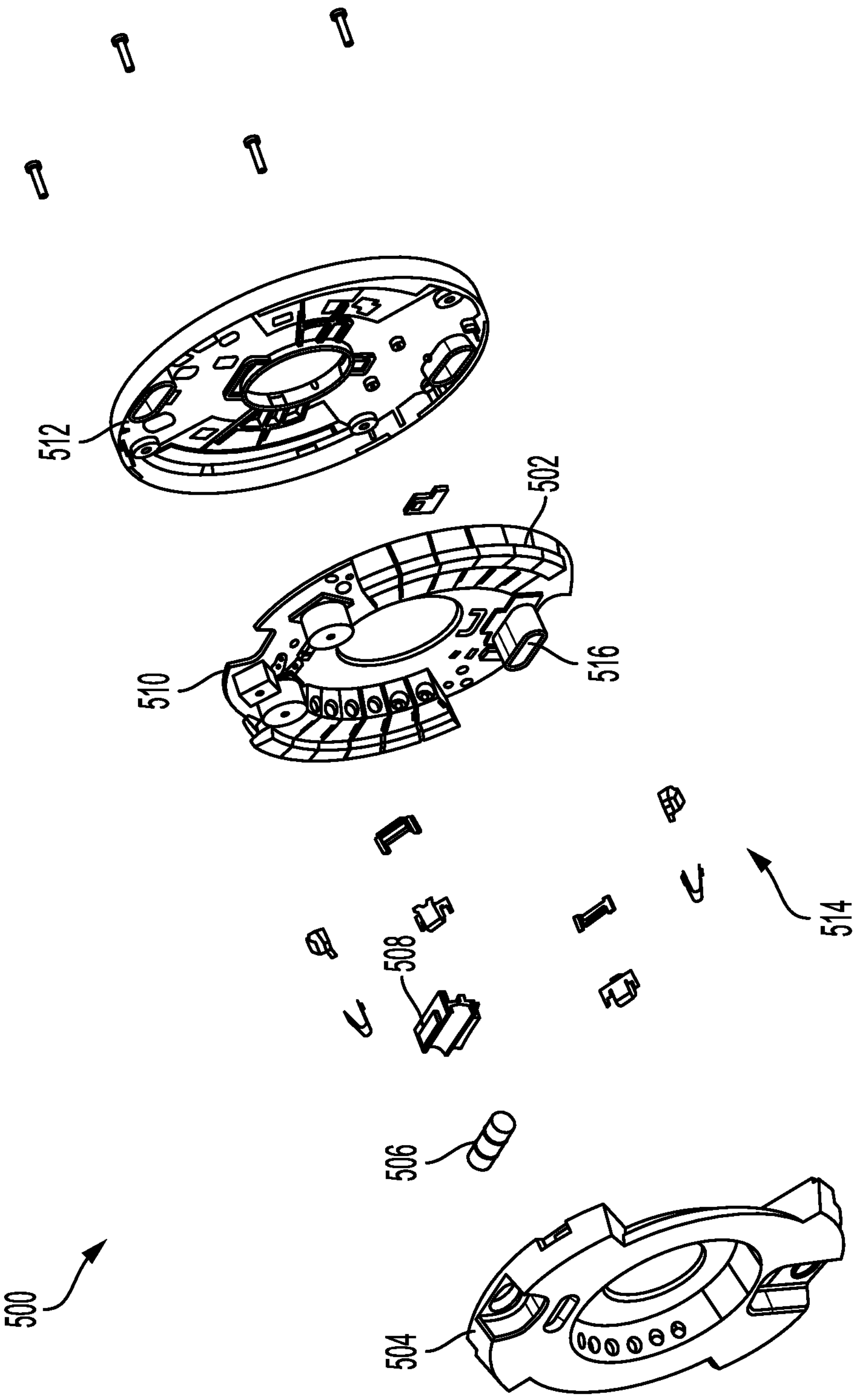
FIG. 5C is an exploded front isometric view of an embodiment of a backplate for a smart thermostat, according to some implementations of the present disclosure.

FIG. 5C is an exploded front isometric view of the smart thermostat backplate of FIGS. 5A and 5B. Visible in this view, the backplate 500 includes a cap 504, a level 506, a level holder 508, and a coupling plate 510. Various components of the backplate 500 are coupled to one another with one or more fasteners 514. Fasteners 514 may be screws, nails, or some other form of fastener. Fasteners 514 can securely hold backplate 500 and, possibly, a trim plate (not shown) to a surface, such as a wall. A thermostat may removably attach with backplate 500. A user may be able to attach thermostat to backplate 500 by pushing thermostat against backplate 500. Similarly, a user can remove the thermostat from backplate 500 by pulling the thermostat away from backplate 500. When the thermostat is connected with backplate 500, the thermostat is electrically connected various HVAC control wires that have been connected with the receptacles of backplate 500 as would be appreciated by one having ordinary skill in the art.

Further visible in FIG. 5C, a cap 504 for protecting various internal components from damage and for providing an aesthetically pleasing appearance when the electronic device is not mounted to the backplate 500. The cap 504 covers a level 506 for properly mounting the electronic device and/or the backplate 500 to a surface. For example, it would be desirable to have text displayed on the electronic display of the smart thermostat to be straight across (e.g., perpendicular to the ground, etc.). The level 506 may be a bubble level in at least some embodiments. A level holder 508 may be provided to align the level 506 relative to the cap 504, a coupling plate 510, and a base 512. Additional coupling mechanisms may be provided including adhesives, screws, snaps, wires, or the like. The coupling plate 510 may include one or more fasteners as described in detail above. The coupling plate 510 may further include a board-to-board (BTB) connector 516 in some embodiments.

The backplate 500 may include more or less components than those shown in FIGS. 5A-5C. In various embodiments, the components may be in one or more configurations other than the configuration shown in FIGS. 5A-5C. For example, the backplate 500 may be part of a greater thermostat mounting system including a trim plate, batteries, various fasteners, sensors, or the like.

Figure 6:
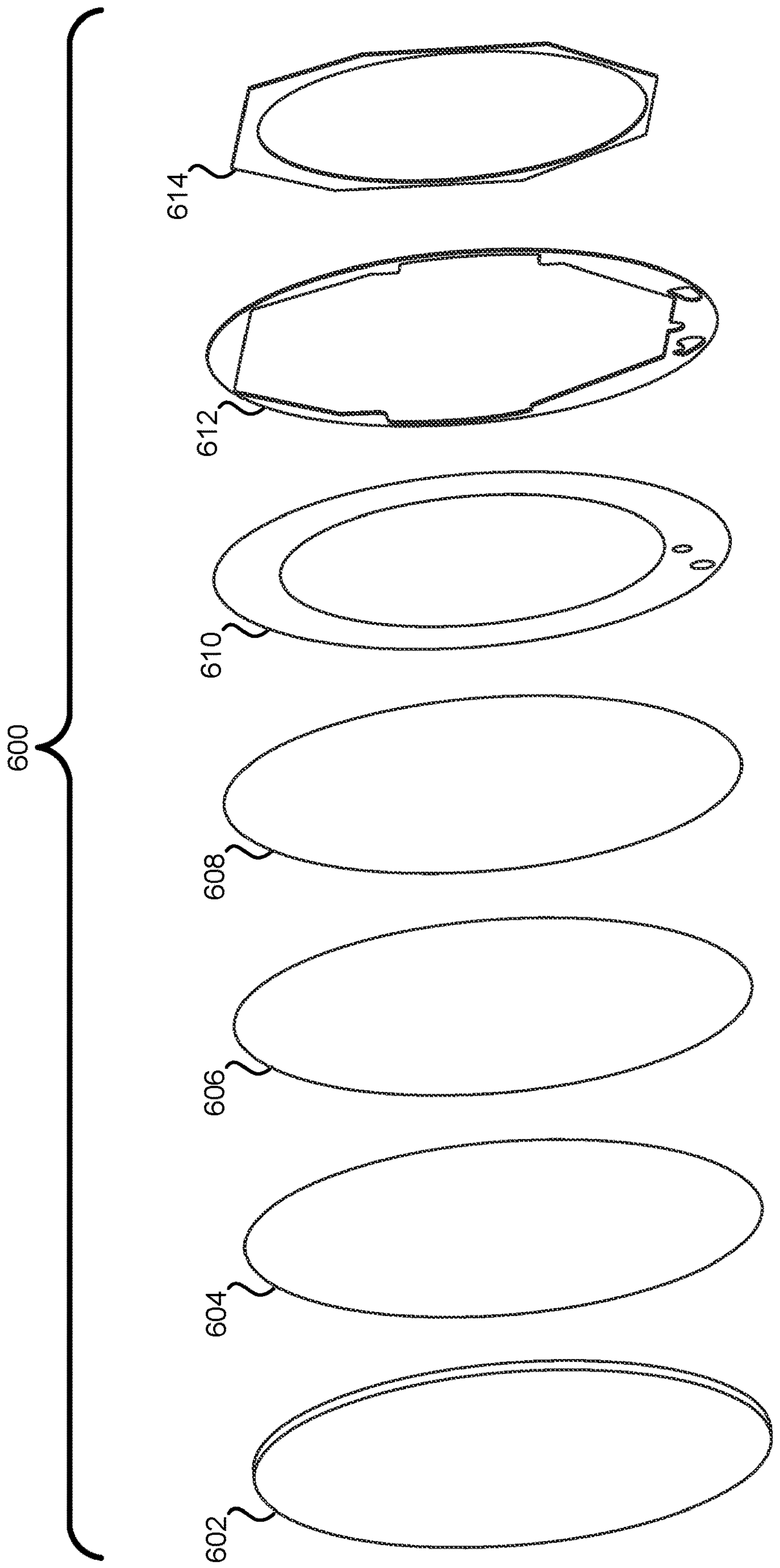
FIG. 6 is an exploded front isometric view of an embodiment of the layers of a domed lens assembly, according to some implementations of the present disclosure.

FIG. 6 is an exploded front view of various embodiments of lens assembly 600. Lens assembly 600 can represent embodiments of lens assembly 122 and 212. In particular, FIG. 6 illustrates an embodiment of a stack of components that can be used to create lens assembly 122. Lens assembly 600 can include: domed lens 602; optically clear adhesive (OCA) layer 604; tinted ink layer 606; mirror film 608; masking layer 610; frame pressure sensitive adhesive (PSA) 612; and display PSA 614. While embodiments of lens assembly 600 may be used on smart thermostat 200, embodiments of such a lens assembly may be used on other forms of smart devices. For instance, lens assembly 600 can be incorporated as part of a smart assistant device or a smart watch.

Domed lens 602 may be domed on an outer surface and flat on an inner surface that is in contact with OCA lay 604. Further detail regarding the shape of domed lens 602 is provided in reference to FIG. 7. Domed lens 602 can be formed from polymethyl methacrylate (PMMA), which can provide a transparency similar to glass. Other plastic or acrylic materials are also possible. Domed lens 602 may also be formed from glass. Domed lens 602 can be formed using injection compression molding. Injection compression molding can be used because it allows for defect-free surfaces to be formed. To perform injection compression molding of domed lens 602, material can be injected into a nearly closed mold. The mold may then be compressed such that the injected material conforms to the shape of the mold. Excess material can be removed, such as through machining.

Domed lens 602 is circular and does not have any holes, vents, gaps, or other discontinuities present on it. Similarly, no holes, vents, gaps, or other discontinuities are present on at least OCA lay 604, tinted ink layer 606, and mirror film layer 608. Having continuous material helps to maintain a consistent visual effect across the entirety of lens assembly 600 as viewed by a user.

OCA lay 604 can be a pressure or temperature sensitive adhesive that adheres domed lens 602 with tinted ink layer 606. Tinted ink layer 606 can be a transparent layer that tints light passing through tinted ink layer 606. Since tinted ink layer 606 is closer to domed lens 602 than mirror film layer 608, both light by mirror film layer 608 and light emitted by electronic display 111 is tinted. The color used for tinting can be selected based on aesthetics.

Mirror film layer 608 may have sufficient reflectivity that when electronic display 111 is not illuminated, a user viewing lens assembly 400 may see a reflection of himself, herself, or the ambient environment. For example, mirror film layer 608 can be Toray® 125FH-40 mirror film. Mirror film layer 608 may be polarized. Due to the way some mirror films are manufactured, throughout a roll of mirror film, the direction of polarization can vary. When a piece of mirror film is stamped or cut out to form mirror film layer 608, the direction of polarization may be determined in order to orient in relation the electronic display, which also outputs polarized light. If orientation is not controlled, visibility of the electronic display through mirror film layer 608 may be adversely affected. Further detail regarding orientation of mirror film layer 608 is detailed in relation to FIG. 7.

Masking layer 610 can be used to block a user from viewing components blocked by the opaque portions of masking layer 610. Masking layer 610 may be black or another dark color to make it difficult to see through mirror film layer 608. Masking layer 610 can obscure a view of frame adhesive 612 and display adhesive 614. Masking layer 610 may be asymmetric. Therefore, it must be oriented in a particular orientation with respect to other components of smart thermostat 200. For example, masking layer 610 includes a hole for an ambient light sensor to have a field of view of the ambient environment through domed lens 602, OCA lay 604, tinted link layer 606, and mirror film layer 608.

Furthermore, the masking layer 610 may help enhance the effect that the electronic display is seamless with lens assembly 400. A color value for masking layer 610 may be selected, having an appropriate lightness value, such that it is difficult or impossible for a user to visually see an edge of the electronic display screen within the smart device. By obscuring an edge of the edge of the electronic display, a user may have the impression that the entire region behind domed lens 602 is electronic display 111.

Obscured behind masking layer 610 may be two separate adhesive layers. Frame adhesive layer 612 may adhere domed lens layer 402, OCA lay 604, tinted link layer 606, mirror film layer 608, and masking layer 610 to display frame 302. Display adhesive layer 614 may adhere domed lens layer 402, OCA lay 604, tinted link layer 606, mirror film layer 608, and masking layer 610 to electronic display 202. Different types of adhesives may be used to provide better adhesion to the material of electronic display 202 and display frame 302. Adhesive layer 612 and display adhesive layer 614 may both be different types of pressure sensitive adhesives (PSAs). In other embodiments, a single adhesive layer may be used. For example, 3M® 5126-025 may be used as the PSA.

Figure 7:
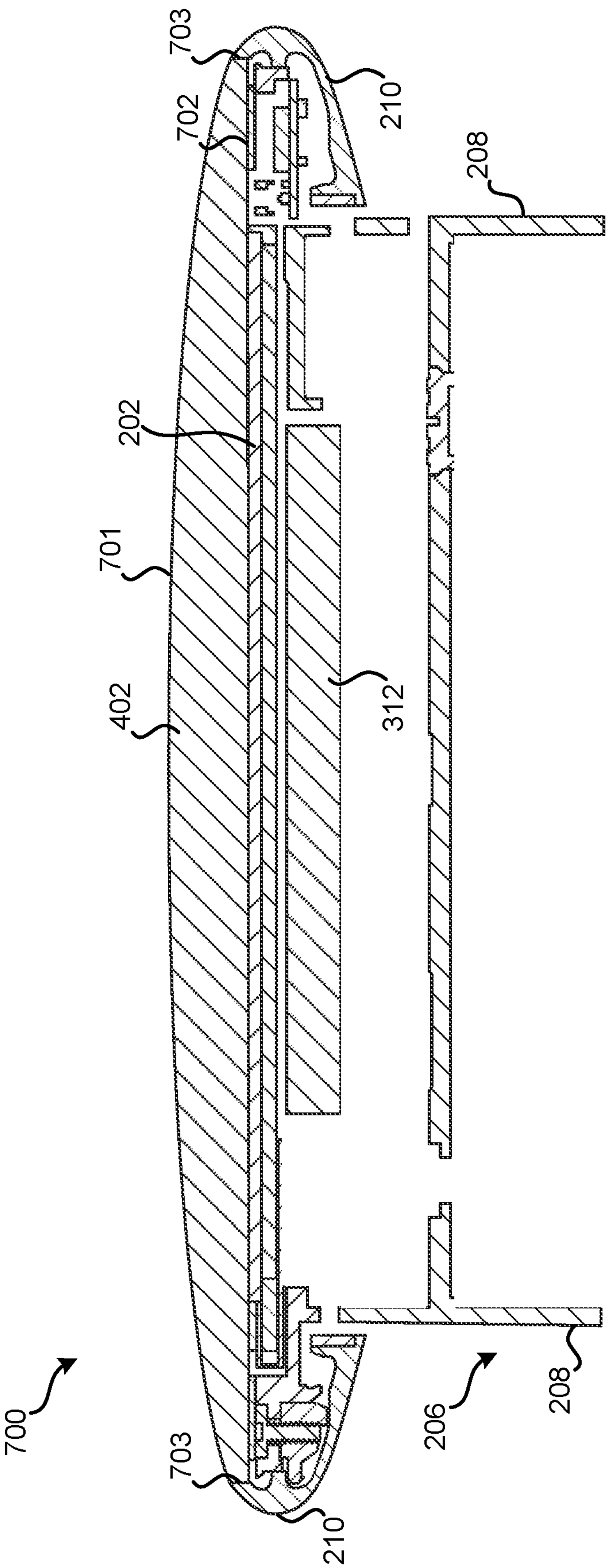
FIG. 7 is a cross section of an embodiment of a smart thermostat, according to some implementations of the present disclosure.

FIG. 7 is a cross section 700 of an embodiment of smart thermostat 200. The location and direction of cross section 700 is indicated on FIG. 2B. The domed profile of domed lens 602 is visible in the cross section 700 of FIG. 7. Surface 701 is the outer surface of domed lens 602 that is adjacent the ambient environment and which a user can touch. An entirety of surface 701 is convex from edge to edge. Surface 702 is the inner surface and adheres with OCA layer 604. OCA layer 604 and other layers of lens assembly 600 are not visible in FIG. 7. An entirety of surface 702 can be flat. Surface 703 forms a circumference around the entirety of domed lens 602. Surface 703 is perpendicular or approximately perpendicular (defined as within 5° of perpendicular) to surface 702.

Electronic display 202 is disposed under the domed lens 602 and surrounded by rotatable ring 710. In particular, ring 210 surrounds surface 703 of domed lens 602 and couples to housing 206, which has a cylindrical sidewall 208.

Figure 8:
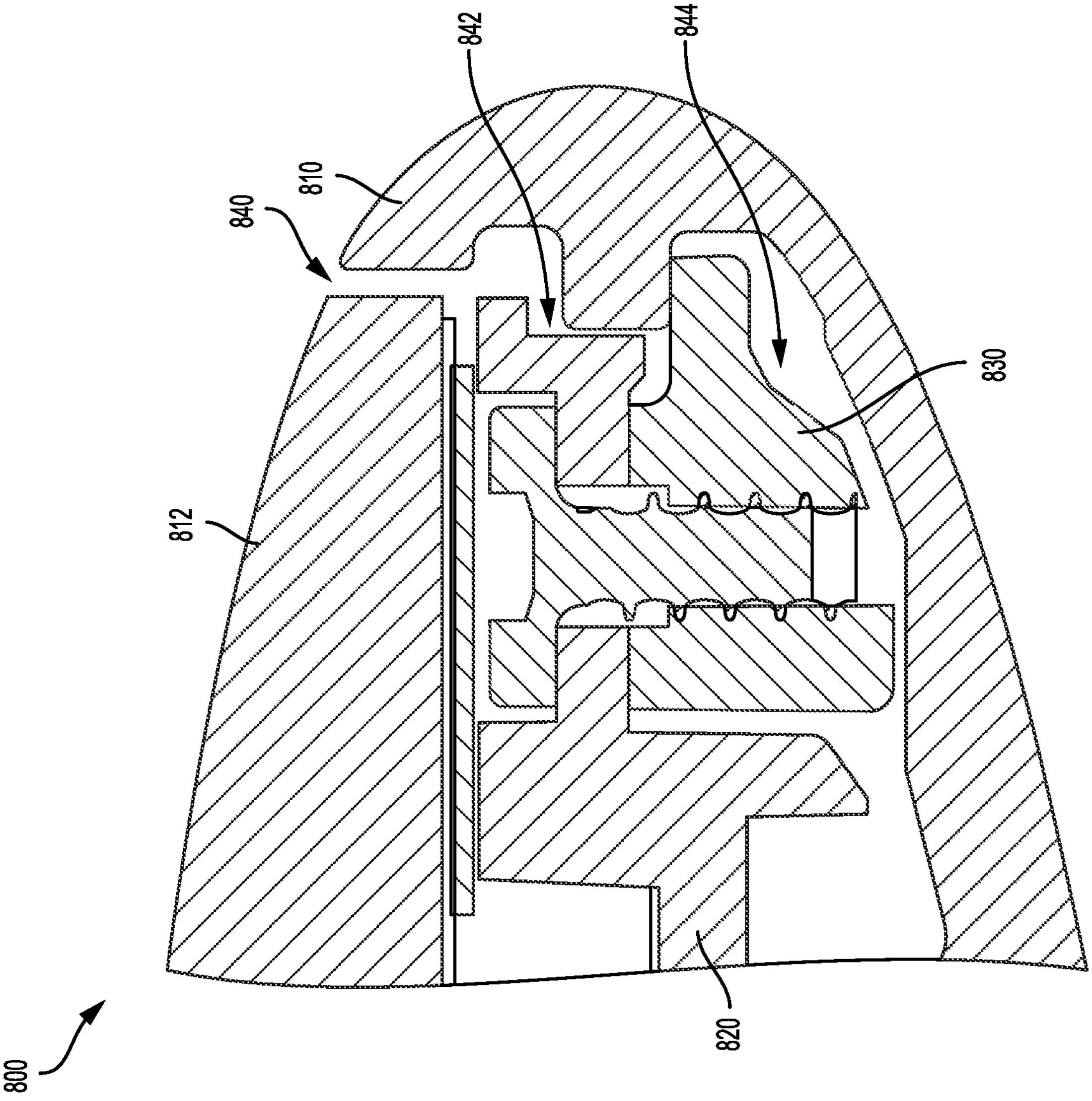
FIG. 8 is an enlarged cross section of a side view of an embodiment of a smart thermostat, according to some implementations of the present disclosure.

FIG. 8 is an enlarged cross section of a side view of a smart thermostat. Electronic device 800 may be similar to smart thermostat 200 and smart thermostat 500. Similar components may be similarly numbered and have similar form and function unless otherwise noted herein. As shown in FIG. 8, the clip 830, the display frame 820, and the ring 810 are assembled such that a gap 840 is formed between an outer perimeter of the domed lens 812 and a corresponding internal perimeter of the ring 810. In various embodiments, the gap 840 is not visible to the user facing the electronic device 800. For example, the mirrored reflective cover of the domed lens 812 smoothly transitions to the polished finish of the ring 810 with no disruptions. The gap 840 is optimized to be as small as possible while enabling the ring 810 to be rotated relative to the domed lens 812 and/or the electronic display (not shown in this view).

According to various embodiments, the display frame 820 includes a grease trap recess 842 for directing grease between the display frame 820 and the clip 830. For example, grease may be applied between a vertical interface (such as formed by the grease trap recess 842) of the display frame 820 and the ring 810 for continuous rotation of the ring 810 relative to the rest of the electronic device 800 (e.g., including the sidewall of the housing and the backplate) without disruption. In exemplary embodiments, a grease is applied such that the user experiences a pleasing, viscous feeling when rotating the ring 810. The grease may include a damping grease and/or a dry grease. Different types of grease may be applied at different regions between the components unless otherwise noted herein.

In at least some embodiments, the clip 830 is formed to reduce grease shearing between the clip 830 and the ring 810 at location 844. For example, grease applied at the grease trap recess 842 may be displaced to an area proximate location 844. The combination of the tuned gap 840 and grease application enhances the user experience during rotation of the ring 810 and selection of various icons and/or information displayed on the electronic display when the information is visible (e.g., when the electronic display is "ON") through the domed lens 812.

In various embodiments, one or more temperature sensors (not shown) may be disposed between the ring 810 and the clip 830 and/or the display frame 820. For example, the one or more temperature sensors may be disposed in the portion of the electronic device 800 that overhangs the sidewall (not shown) that mounts the electronic device 800 to a mounting surface. Said another way, the electronic device 800 may form a "mushroom" shape and one or more temperature sensors are disposed proximate an outer perimeter of the "cap" of the mushroom.

Figure 9:
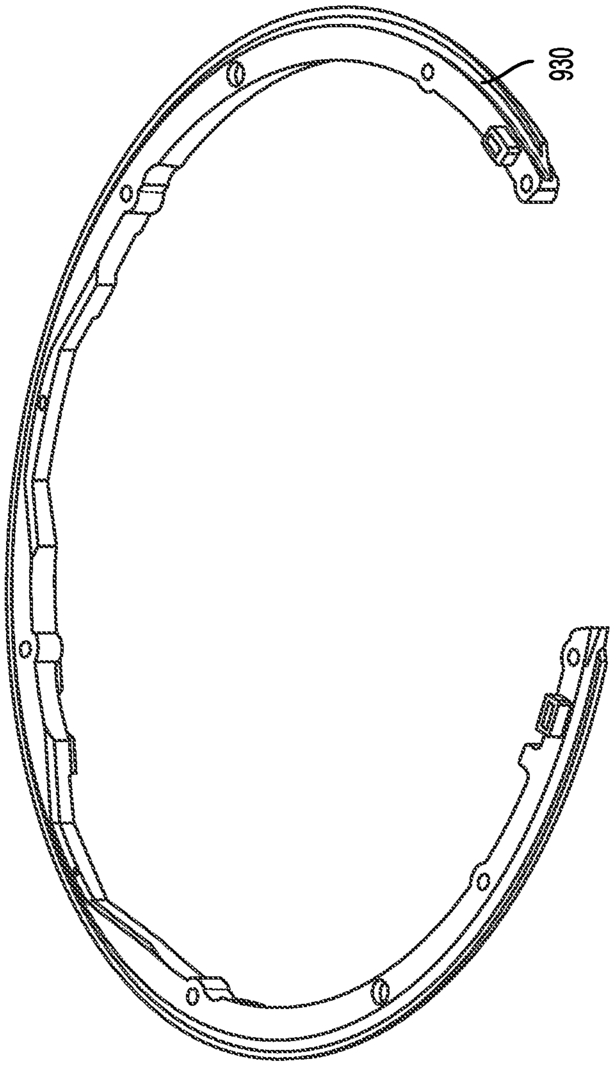
FIG. 9 is a clip for use with a smart thermostat, according to some implementations of the present disclosure.

FIG. 9 is clip for use with a smart thermostat. The clip 930 may be of the same type as various clips described herein. The clip 930 may be a C-clip as shown in FIG. 9. The clip 930 acts as an axial constraint for various components of the electronic device and couples at least the display frame and the ring. The clip 930 is optimized for assembly such that the clip 930 is relatively thin within the electronic device housing. The open end of the clip 930 as shown in FIG. 9 enables efficient installation and removal of the clip 930 during servicing or other activities involving disassembling the electronic device.

Figure 10:
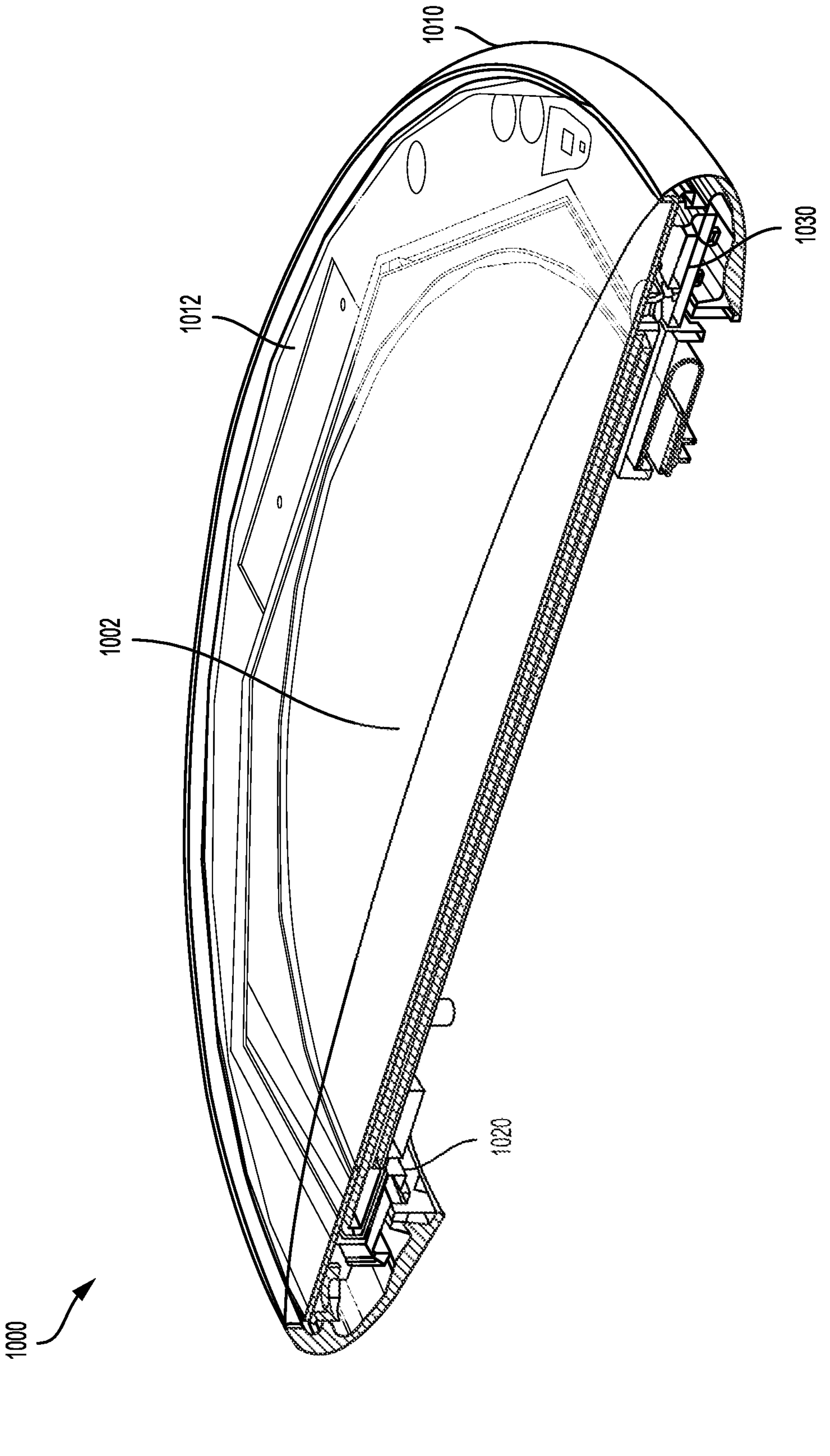
FIG. 10 is an isometric cross section of a side view of an embodiment of a smart thermostat, according to some implementations of the present disclosure.

FIG. 10 is an isometric cross section of a side view of a smart thermostat. FIG. 10 provides another view of the various electronic devices described in detail above. In particular, electronic device 1000 may be similar to other electronic devices described above and similar components may be similarly numbered and have similar form and function unless otherwise noted herein. The domed profile of a domed lens 1012 is visible in the cross section of FIG. 10. An electronic display 1002 is disposed under the domed lens 1012 and supported by a ring 1010 and a display frame 1020 as described in detail above. In particular, the ring 1010 surrounds the domed lens 1012. The clip 1030 couples the display frame 1020 supporting the electronic display 1002 to the housing (not shown).

Figure 11A:
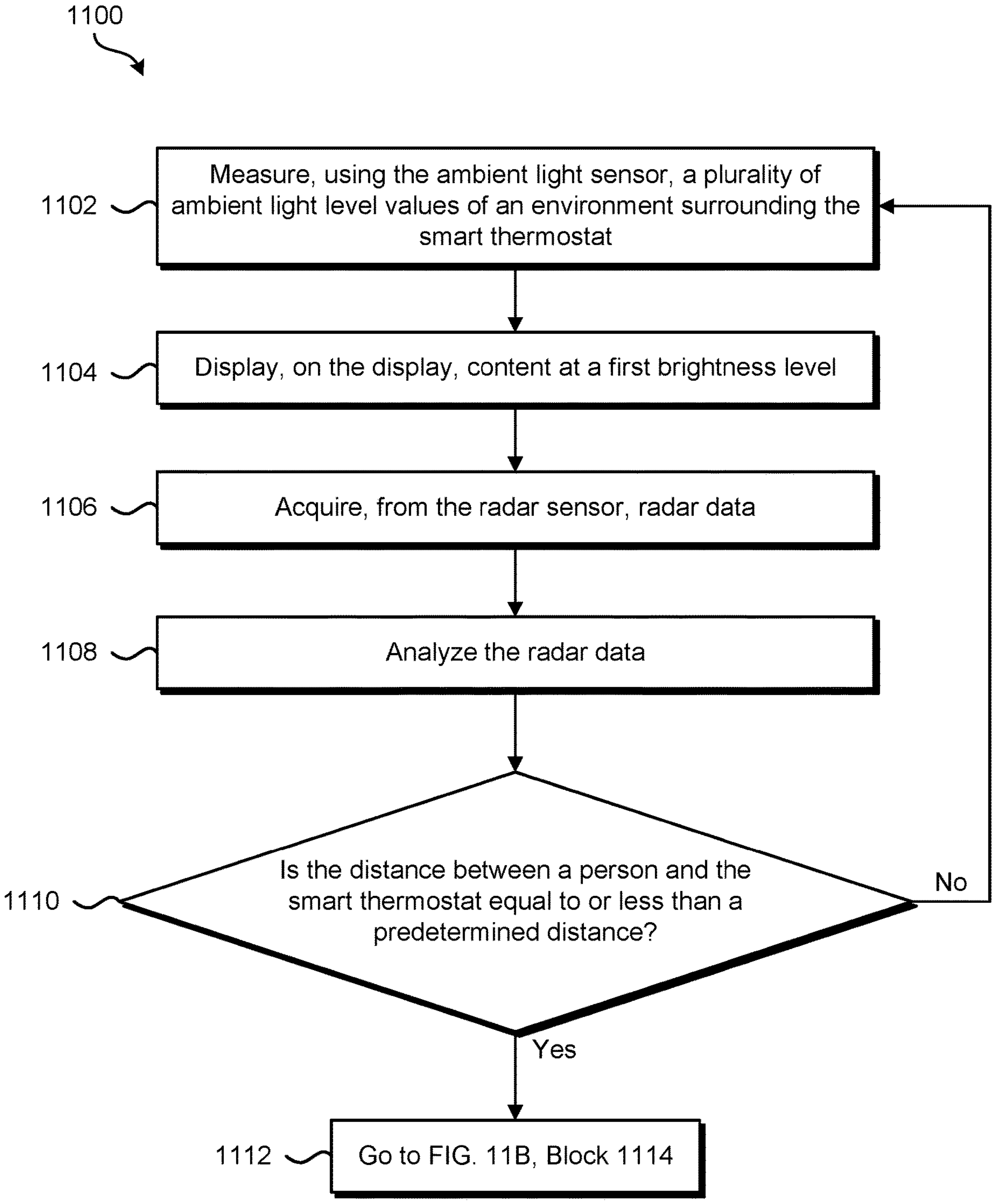
FIGS. 11A-11C illustrates an example of a process for performing an intelligent brightness lock for a smart thermostat, according to some implementations of the present disclosure.
Figure 11B:
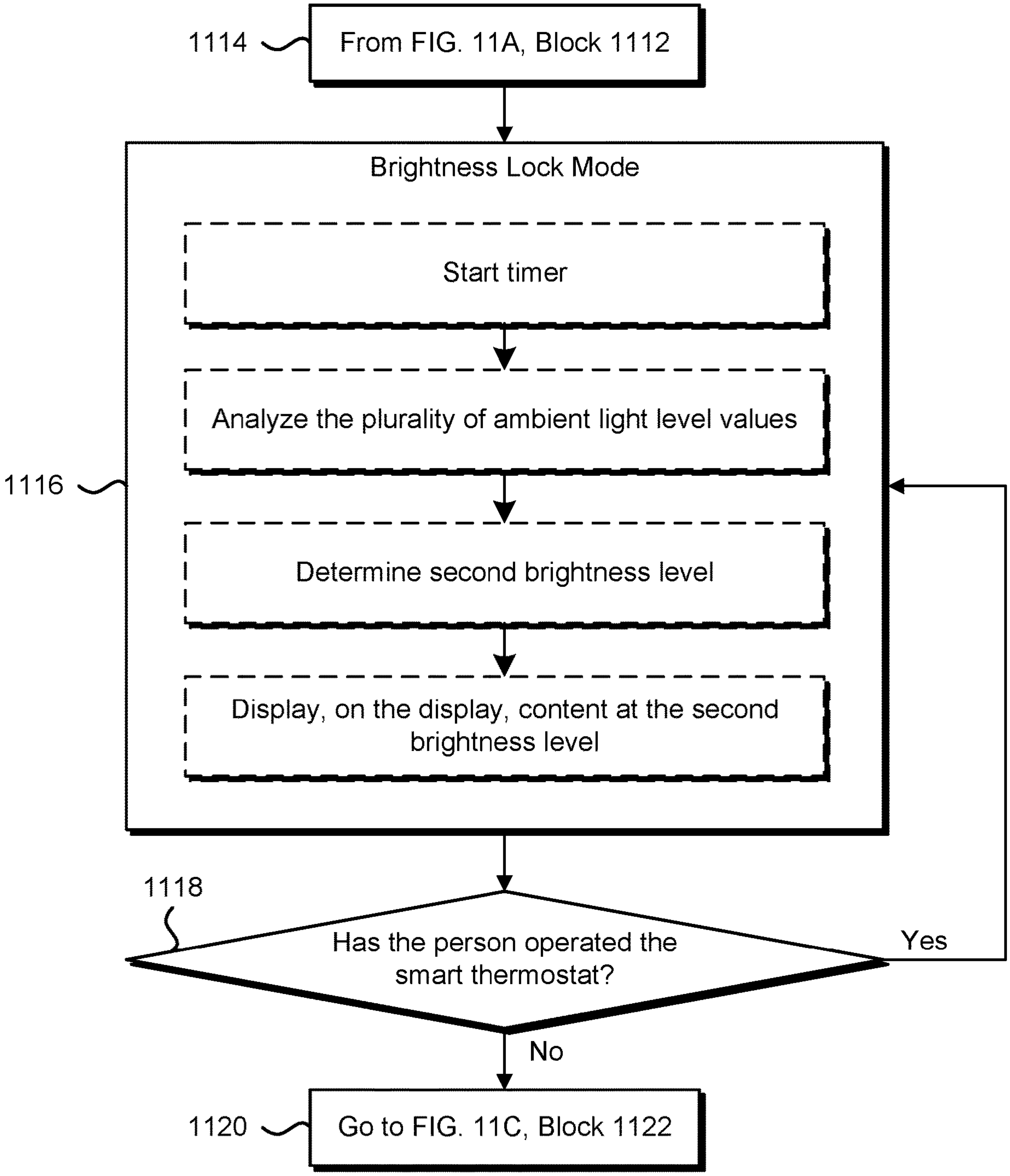
Figure 11C:
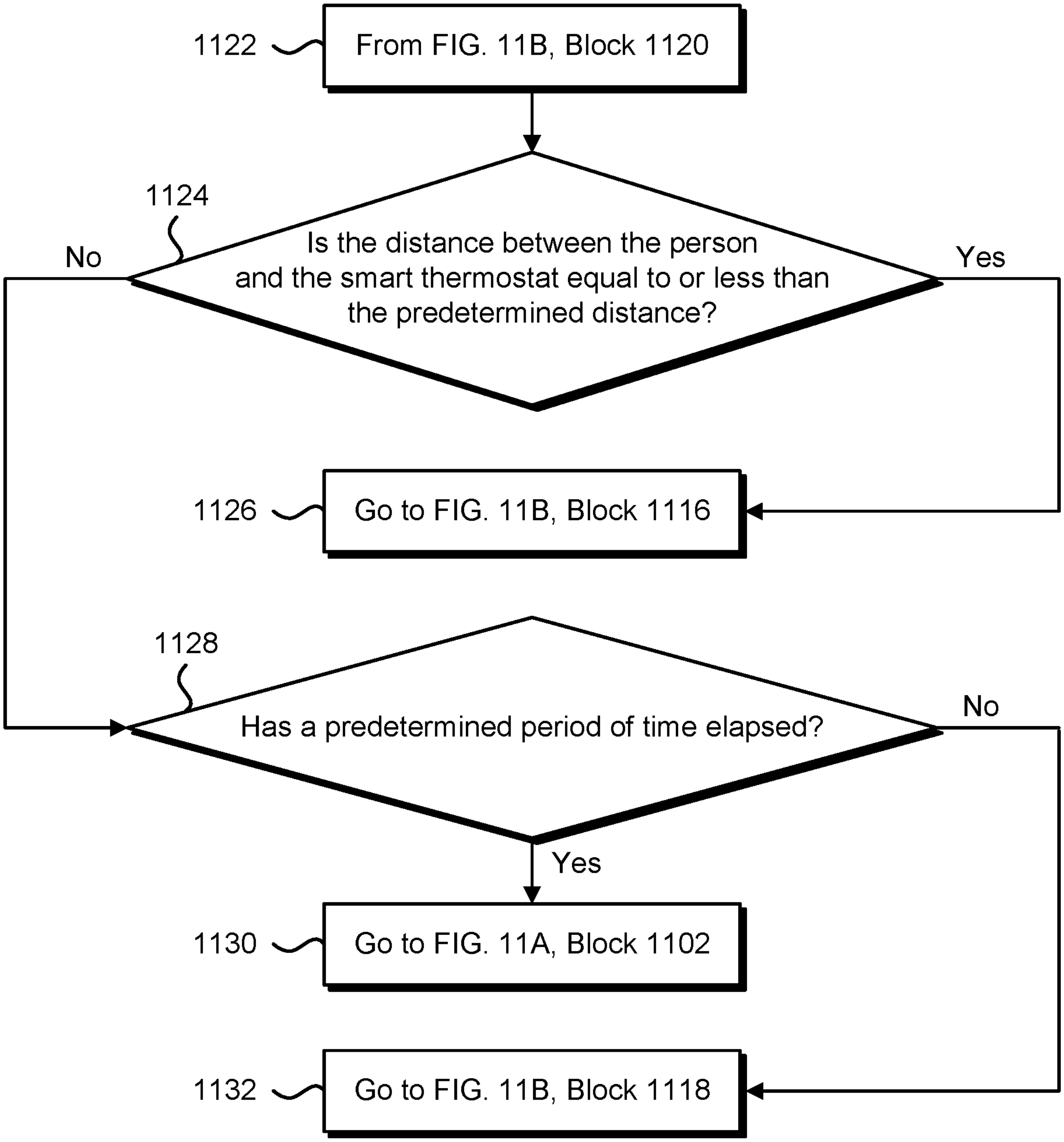

FIGS. 11A-11C illustrates an example of a process 1100 for performing an intelligent brightness lock for a smart thermostat. The smart thermostat can include, among other things, the display, an ambient light sensor, a radar sensor, and a processing system. In some implementations, the smart thermostat can be the smart thermostat 110 of FIG. 1 and the display, ambient light sensor, radar sensor, and processing system can be the electronic display 111, ambient light sensor 116, radar sensor 113, and processing system 119 of the smart thermostat 110. The process 1100 can be implemented by the smart thermostat such as by the processing system. The process 1100 can be implemented in software or hardware or any combination thereof.

At block 1102, a plurality of ambient light level values of an environment surrounding the smart thermostat is measured using the ambient light sensor. In some implementations, the ambient light sensor, which can be the ambient light sensor 116, may periodically sense the amount of light present in the environment of the smart thermostat and output an ambient light level value indicative of the amount of light each time the amount of light is sensed. In some implementations, the amount of light may be sensed at a particular sensing rate (e.g., 60 samples per minute) and an ambient light level value indicative of the amount of light each the amount of light is sensed may be output. In some implementations, the ambient light sensor may continuously sense the amount of light and output an ambient light level value indicative of the amount of light each time the amount of light is sensed. In some embodiments, the ambient light sensor senses an amount of ambient light through a cover of the smart thermostat such as the cover 122. In some implementations, a light pipe may be present between the ambient light sensor and the cover such that in a particular region of the cover, light that is transmitted through the cover, is directed to the ambient light sensor. The output of the ambient light sensor may be analyzed using a processing system such as the processing system 119.

At block 1104, content is displayed on the display. In some implementations, the display can be the electronic display 111. In some implementations, the content includes an ambient temperature of the environment surrounding the smart thermostat. In some implementations, the content includes a temperature set point of an air management system (e.g., an HVAC system) in communication with the smart thermostat. In some implementations, the content includes both the ambient temperature of the environment surrounding the smart thermostat and the temperature set point of the air management system.

In some implementations, the content is displayed on the display at a first brightness level. In some implementations, the first brightness level of the display is determined based on a brightness curve. The brightness curve can be configured to associate brightness levels (e.g., in nits) for given ambient light level values. In some implementations, the smart thermostat can be configured to store the brightness curve and, for a given ambient light level value, can return a brightness level that is associated with the given ambient light level value in the brightness curve. For example, for an ambient light value of the plurality of ambient light values measured at block 1102 (e.g., the most recent ambient light value), the smart thermostat can reference the brightness curve to determine the brightness level in the brightness curve that is associated with the ambient light value. The content can then be displayed on the display at the determined brightness level.

At block 1106, radar data is acquired from the radar sensor. In some implementations, the radar sensor, which be the radar sensor 113, is a single IC that can emit radio waves, receive reflected radio waves, and output radar data indicative of the received reflected radio waves. The radar sensor may be configured to acquire radar data by outputting radio waves into the ambient environment in front of the display of the smart thermostat (i.e., the environment surrounding the smart thermostat) and receive radio waves reflected from one or more objects in the environment. In some implementations, the radar sensor may acquire the radar data at a particular rate (e.g., 60 samples per minute). In some implementations, the radar sensor may continuously acquire the radar data.

The radar sensor may emit radio waves and receive reflected radio waves through a cover of the smart thermostat such as the cover 122. The radar sensor may include one or more antennas, one or more radio RF emitters, and one or more RF receivers. The radar sensor may be configured to operate as a FMCW radar. The radar sensor may emit chirps of radar that sweep from a first frequency to a second frequency (e.g., in the form of a saw tooth waveform). Using receive-side beam-steering (e.g., using multiple receiving antennas), certain regions may be targeted for sensing the presence of objects and/or people. The output of the radar sensor, which can be a radar data stream such as the radar data stream 174, may be analyzed using a processing system such as the processing system 119.

At block 1108, the radar data is analyzed. In some implementations, the radar data is analyzed by the processing system. In some implementations, the radar data may be analyzed in rolling time windows (e.g., five second windows). In some implementations, analyzing the radar data includes separating static background radar reflections from moving objects such that radar reflections due to static objects can be filtered out and discarded and foreground radar data remains. In some implementations, the foreground radar data corresponds to only radar reflections from objects that have moved during a rolling time window. In some implementations, analyzing the radar data includes determining an angle and distance to an object in motion that reflected radar. In some implementations, multiple three-dimensional fast FFTs may be performed to produce heat map projections wherein each heat map projection is indicative of an amount of reflected radio waves, a range to the object that reflected the radio waves, and an angle from the radar sensor to the object that reflected the radio waves. Therefore, for example a first heat map may be produced that indicates the range and the azimuthal angle to the object that reflected radio waves and a second heat map may be produced that indicates the range and elevational angle to the object that reflect radio waves.

In some implementations, the radar data may be further analyzed to track a center-of-mass of an object. To track the center-of-mass of the object, information from the multiple heat map projections can be combined and the center of mass can be extracted using an average location of the brightest intensity points in the combined heat map projection. Using the heat map projections, a tracklet map can be generated. The tracklet map can be a three-dimensional map of the movement of a center-of-mass represented as a vector over a historic window of time, such as five or ten seconds, can be generated.

In some implementations, the radar data maybe further analyzed by one or more machine learning models. The one or more machine learning models can be configured to make one or more predictions for one or more persons located within the environment of the smart thermostat. In some implementations, the one or more machine learning models can be configured to receive the tracklet map and process the tracklet map to make one or more predictions for one or more persons located within the environment.

In some implementations, the one or more predictions can include detecting persons within the environment surrounding the smart thermostat (e.g., within a predetermined angle of view and a predetermined range), identifying one or more locations within the environment where those persons are located and/or have been located (e.g., in the case of a moving person, where they were located at a first time and where they are located at a second time after the first time), and determining a distance between each person and the smart thermostat at each of those locations. In some implementations, there may be multiple people within the environment surrounding the smart thermostat. In this case, in some implementations, the prediction engine 178 can predict which person among the people is closest to the smart thermostat.

In some implementations, the one or more predictions can include recognizing a direction in which a person located within the environment is facing (e.g., facing toward the display of the smart thermostat, facing away from the display of the smart thermostat, etc.) and/or a viewing angle in which a person located within the environment is viewing the display of the smart thermostat (e.g., a person is viewing the display at a 30 degree angle with respect to a central axis that passes through an origin of the display).

In some implementations, the one or more predictions can include recognizing gestures performed by a person located within the environment. As used herein, a gesture refers to a movement of a portion of a person's body (e.g., head, face, body, limbs, hands, etc.). For example, the one or more machine learning models can recognize that a person that turned their head from a neutral position with respect to and/or facing away from the display of the smart thermostat to a position in which their face is oriented towards the display of the smart thermostat. In another example, the one or more predictions can include recognizing that a person changed an angle at which they are viewing the display of the smart thermostat.

At block 1110, it is determined whether a distance between a person and the smart thermostat is equal to or less than a predetermined distance. In some implementations, the distance between the person and the smart thermostat can be determined based on the radar data. For example, as described above, one or more locations within the environment where one or more persons in the environment are located may be determined from the radar data and a distance between the smart thermostat and each of those one or more locations can be calculated. In some implementations, the predetermined distance can be three feet and it can be determined whether the person is located in the environment at a distance that is three feet or less from the smart thermostat. The distance between the person and the smart thermostat may indicate the person's desire to interact with and/or view the display of the smart thermostat. Thus, a person located at a position in the environment surrounding the smart thermostat that is a certain distance or less from the smart thermostat may indicate that the person is interacting and/or operating the smart thermostat and/or may desire to do so.

In response to determining that the distance between the person and the smart thermostat is greater than the predetermined distance, the process 1100 returns to block 1102 where the process 1100 is restarted. In response to determining that the distance between the person and the smart thermostat is equal to or less than the predetermined distance, at block 1112, the process 1100 proceeds to block 1114 where a brightness lock mode is started.

At block 1114, the brightness lock mode is started and, while in the brightness lock mode, a timer is started, the plurality of ambient light level values is analyzed, a second brightness level is determined, and the content is displayed on the display at the second brightness level. In some implementations, the timer is configured to measure a predetermined period of time (e.g., 10 seconds). In some implementations, analyzing the plurality of ambient light level values includes determining a maximum ambient light level value of the plurality of ambient light level values within a time window prior to starting the brightness lock mode (e.g., the maximum ambient light level measured within a five second time window before the brightness lock mode is started). In some implementations, determining the second brightness level includes using the maximum ambient light level value to extract an intermediate brightness level from the brightness curve, determining whether or not the intermediate brightness level is equal to or greater than the first brightness level, and, in response to determining that the intermediate brightness level is equal to or greater than the first brightness level, using the intermediate brightness level as the second brightness level, and, in response to determining that the intermediate brightness level is less than the first brightness level, using the first brightness level as the second brightness level. In some implementations, displaying content at the second brightness level includes displaying the ambient temperature of the environment surrounding the smart thermostat at the second brightness level, the temperature set point of an air management system in communication with the smart thermostat at the second brightness level, and/or a combination thereof at the second brightness level. In some implementations, the content displayed at the first brightness level is first content and the content displayed at the second brightness level is second content that is different from the first content. In this way, the same content and/or additional content can be displayed at the second brightness level.

At block 1118, it is determined whether the person has operated the smart thermostat. In some implementations, the determination is made by determining whether the person has provided input to the smart thermostat using a user interface such as user interface 112. For example, the determination can be made by determining whether the person rotated an outer rotatable ring of the user interface and/or pressed the ring inward (toward the rear of the smart thermostat). In response to determining that the person has operated the smart thermostat, the process 1100 returns to block 1116 where the timer is restarted. In response to determining that the person has not operated the smart thermostat, at block 1120, the process 1100 proceeds to block 1122.

At block 1122, it is determined whether the distance between the person and the smart thermostat is equal to or less than the predetermined distance. In some implementations, the distance between the person and the smart thermostat can be determined based on additional radar data acquired from the radar sensor. For example, as described above, in a rolling time window (e.g., radar data in a recent time window of a rolling time window scheme for acquiring radar data), one or more locations within the environment where one or more persons in the environment are located may be determined from the radar data and a distance between the smart thermostat and each of those one or more locations can be calculated. In response to determining that the distance between the person and the smart thermostat is equal to or less than the predetermined distance, at block 1126, the process 1100 returns to block 1116 where the timer is restarted. In response to determining that the distance between the person and the smart thermostat is greater than the predetermined distance, the process 1100 proceeds to block 1128.

At block 1128, it is determined whether the predetermined period of time has elapsed. In some implementations, in the case the predetermined period of time is 10 seconds, it is determined whether the 10 second predetermined period of time has elapsed. In response to determining that the predetermined period of time has elapsed, at block 1130, the process 1100 returns to block 1102 where it is restarted. In response to determining that the predetermined period of time has not elapsed, at block 1132, the process 1100 proceeds to block 1118 where another determination is made as to whether the person has operated the smart thermostat.

Figure 12:
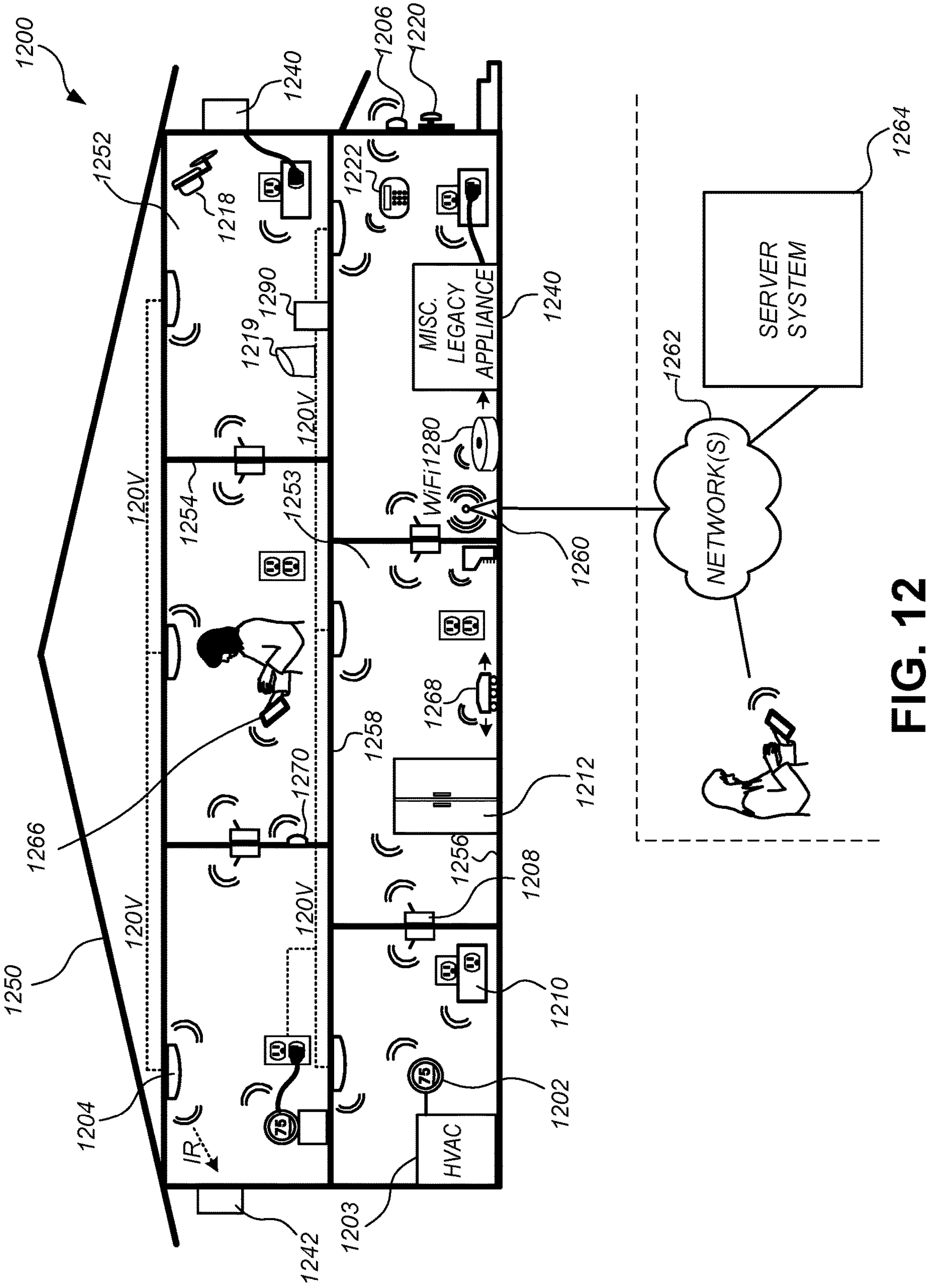
FIG. 12 illustrates an exemplary embodiment of a smart home environment that includes various smart home devices, according to some implementations of the present disclosure.

FIG. 12 illustrates an example smart home environment 1200. As shown in FIG. 12, the smart home environment 1200 includes a structure 1250 (e.g., a house, daycare, office building, apartment, condominium, garage, or mobile home) with various integrated devices. It will be appreciated that devices may also be integrated into a smart home environment 1200 that does not include an entire structure 1250, such as an apartment, condominium or office space. Further, the smart home environment 1200 may control and/or be coupled to devices outside of the actual structure 1250. Indeed, several devices in the smart home environment 1200 need not be physically within the structure 1250 (e.g., although not shown, a pool heater, an irrigation system, and the like).

The term "smart home environment" may refer to smart environments for homes such as a single-family house, but the scope of the present teachings is not so limited. The present teachings are also applicable, without limitation, to duplexes, townhomes, multi-unit apartment buildings, hotels, retail stores, office buildings, industrial buildings, and more generally any living space or workspace. Similarly, while the terms user, customer, installer, homeowner, occupant, guest, tenant, landlord, repair person, and the like may be used to refer to the person or persons acting in the context of some particular situations described herein, these references do not limit the scope of the present teachings with respect to the person or persons who are performing such actions. Thus, for example, the terms user, customer, purchaser, installer, subscriber, and homeowner may often refer to the same person in the case of a single-family residential dwelling, because the head of the household is often the person who makes the purchasing decision, buys the unit, and installs and configures the unit, and is also one of the users of the unit. However, in other scenarios, such as a landlord-tenant environment, the customer may be the landlord with respect to purchasing the unit, the installer may be a local apartment supervisor, a first user may be the tenant, and a second user may again be the landlord with respect to remote control functionality. While the identity of the person performing the action may be germane to a particular advantage provided by one or more of the implementations, such identity should not be construed in the descriptions that follow as necessarily limiting the scope of the present teachings to those particular individuals having those particular identities.

The depicted structure 1250 includes a plurality of rooms 1252, separated at least partly from each other via walls 1254. The walls 1254 may include interior walls or exterior walls. Each room may further include a floor 1256 and a ceiling 1258. Devices may be mounted on, integrated with and/or supported by a wall 1254, floor 1256, or ceiling 1258.

In some implementations, the integrated devices of the smart home environment 1200 include intelligent, multi-sensing, network-connected devices that integrate seamlessly with each other in a smart home network and/or with a central server or a cloud-computing system to provide a variety of useful smart home functions. The smart home environment 1200 may include, among other things, one or more intelligent, multi-sensing, network-connected thermostats 1202 (hereinafter referred to as "smart thermostats 1202"), hazard detection units 1204 (hereinafter referred to as "smart hazard detectors 1204"), entryway interface devices 1206 and 1220, and alarm systems 1222 (hereinafter referred to as "smart alarm systems 1222").

A smart thermostat may detect ambient climate characteristics (e.g., temperature and/or humidity) and control an HVAC system 1203 accordingly. For example, a respective smart thermostat includes an ambient temperature sensor. In some implementations, a respective smart thermostat also includes one or more sensors (e.g., an ambient light sensor and/or a radar sensor) that may be used to control an operation of the respective smart thermostat. For example, based on radar data acquired from a radar sensor included in the smart thermostat and an ambient light level measure by an ambient light sensor included in the smart thermostat, as described above and shown in FIGS. 11-15, a display of the smart thermostat may be controlled.

A smart hazard detector may detect smoke, carbon monoxide, and/or some other hazard present in the environment. The one or more smart hazard detectors 1204 may include thermal radiation sensors directed at respective heat sources (e.g., a stove, oven, other appliances, a fireplace, etc.). For example, a smart hazard detector 1204 in a kitchen 1253 includes a thermal radiation sensor directed at a network-connected appliance 1212. A thermal radiation sensor may determine the temperature of the respective heat source (or a portion thereof) at which it is directed and may provide corresponding black-body radiation data as output.

The smart doorbell 1206 and/or the smart door lock 1220 may detect a person's approach to or departure from a location (e.g., an outer door), control doorbell/door locking functionality (e.g., receive user inputs from a portable electronic device 1266 to actuate the bolt of the smart door lock 1220), announce a person's approach or departure via audio or visual means, and/or control settings on a security system (e.g., to activate or deactivate the security system when occupants go and come). In some implementations, the smart doorbell 1206 includes a camera, and, therefore, is also called "doorbell camera 1206" in this document.

The smart alarm system 1222 may detect the presence of an individual within close proximity (e.g., using built-in IR sensors), sound an alarm (e.g., through a built-in speaker, or by sending commands to one or more external speakers), and send notifications to entities or users within/outside of the smart home environment 1200. In some implementations, the smart alarm system 1222 also includes one or more input devices or sensors (e.g., keypad, biometric scanner, NFC transceiver, microphone) for verifying the identity of a user, and one or more output devices (e.g., display, speaker). In some implementations, the smart alarm system 1222 may also be set to an armed mode, such that detection of a trigger condition or event causes the alarm to be sounded unless a disarming action is performed.

In some implementations, the smart home environment 1200 includes one or more intelligent, multi-sensing, network-connected wall switches 1208 (hereinafter referred to as "smart wall switches 1208"), along with one or more intelligent, multi-sensing, network-connected wall plug interfaces 1210 (hereinafter referred to as "smart wall plugs 1210"). The smart wall switches 1208 may detect ambient lighting conditions, detect room-occupancy states, and control a power and/or dim state of one or more lights. In some instances, smart wall switches 1208 may also control a power state or speed of a fan, such as a ceiling fan. The smart wall plugs 1210 may detect occupancy of a room or enclosure and control the supply of power to one or more wall plugs (e.g., such that power is not supplied to the plug if nobody is at home).

In some implementations, the smart home environment 1200 of FIG. 12 includes a plurality of intelligent, multi-sensing, network-connected appliances 1212 (hereinafter referred to as "smart appliances 1212"), such as refrigerators, stoves, ovens, televisions, washers, dryers, lights, stereos, intercom systems, wall clock, garage-door openers, floor fans, ceiling fans, wall air conditioners, pool heaters, irrigation systems, security systems, space heaters, window AC units, motorized duct vents, and so forth. In some implementations, when plugged in, an appliance may announce itself to the smart home network, such as by indicating what type of appliance it is, and it may automatically integrate with the controls of the smart home. Such communication by the appliance to the smart home may be facilitated by either a wired or wireless communication protocol. The smart home may also include a variety of non-communicating legacy appliances 1240, such as old conventional washer/dryers, refrigerators, and the like, which may be controlled by smart wall plugs 1210. The smart home environment 1200 may further include a variety of partially communicating legacy appliances 1242, such as infrared ("IR") controlled wall air conditioners or other IR-controlled devices, which may be controlled by IR signals provided by the smart hazard detectors 1204 or the smart wall switches 1208.

In some implementations, the smart home environment 1200 includes one or more network-connected cameras 1218 that are configured to provide video monitoring and security in the smart home environment 1200. Cameras 1218 may be mounted in a location, such as indoors and to a wall or can be moveable and placed on a surface. Various embodiments of cameras 1218 may be installed indoors or outdoors. Cameras 1218 may be used to determine occupancy of the structure 1250 and/or particular rooms 1252 in the structure 1250, and thus may act as occupancy sensors. For example, video captured by the cameras 1218 may be processed to identify the presence of an occupant in the structure 1250 (e.g., in a particular room). Specific individuals may be identified based, for example, on their appearance (e.g., height, face) and/or movement (e.g., their walk/gait). Cameras 1218 may additionally include one or more sensors (e.g., IR sensors, motion detectors), input devices (e.g., microphone for capturing audio), and output devices (e.g., speaker for outputting audio). In some implementations, the cameras 1218 are each configured to operate in a day mode and in a low-light mode (e.g., a night mode). In some implementations, the cameras 1218 each include one or more IR illuminators for providing illumination while the camera is operating in the low-light mode. In some implementations, the cameras 1218 include one or more outdoor cameras. In some implementations, the outdoor cameras include additional features and/or components such as weatherproofing and/or solar ray compensation.

The smart home environment 1200 may additionally or alternatively include one or more other occupancy sensors (e.g., the smart doorbell 1206, smart door locks 1220, touch screens, IR sensors, microphones, ambient light sensors, motion detectors, smart nightlights 1270, etc.). In some implementations, the smart home environment 1200 includes radio-frequency identification (RFID) readers (e.g., in each room or a portion thereof) that determine occupancy based on RFID tags located on or embedded in occupants. For example, RFID readers may be integrated into the smart hazard detectors 1204.

Smart home assistant 1219 may have one or more microphones that continuously listen to an ambient environment. Smart home assistant 1219 may be able to respond to verbal queries posed by a user, possibly preceded by a triggering phrase. Smart home assistant 1219 may stream audio and, possibly, video if a camera is integrated as part of the device, to a cloud-based server system 1264 (which represents an embodiment of cloud-based server system 150 of FIG. 1). Smart home assistant 1219 may be a smart device through which non-auditory discomfort alerts may be output and/or an audio stream from the streaming video camera can be output.

By virtue of network connectivity, one or more of the smart-home devices may further allow a user to interact with the device even if the user is not proximate to the device. For example, a user may communicate with a device using a computer (e.g., a desktop computer, laptop computer, or tablet) or another portable electronic device 1266 (e.g., a mobile phone, such as a smart phone). A webpage or application may be configured to receive communications from the user and control the device based on the communications and/or to present information about the device's operation to the user. For example, the user may view a current set point temperature for a device (e.g., a stove) and adjust it using a computer. The user may be in the structure during this remote communication or outside the structure.

As discussed above, users may control smart devices in the smart home environment 1200 using a network-connected computer or portable electronic device 1266. In some examples, some or all of the occupants (e.g., individuals who live in the home) may register their portable electronic device 1266 with the smart home environment 1200. Such registration may be made at a central server to authenticate the occupant and/or the device as being associated with the home and to give permission to the occupant to use the device to control the smart devices in the home. An occupant may use their registered portable electronic device 1266 to remotely control the smart devices of the home, such as when the occupant is at work or on vacation. The occupant may also use their registered device to control the smart devices when the occupant is actually located inside the home, such as when the occupant is sitting on a couch inside the home. It should be appreciated that instead of or in addition to registering portable electronic devices 1266, the smart home environment 1200 may make inferences about which individuals live in the home and are therefore occupants and which portable electronic devices 1266 are associated with those individuals. As such, the smart home environment may "learn" who is an occupant and permit the portable electronic devices 1266 associated with those individuals to control the smart devices of the home.

In some implementations, in addition to containing processing and sensing capabilities, smart thermostat 1202, smart hazard detector 1204, smart doorbell 1206, smart wall switch 1208, smart wall plug 1210, network-connected appliances 1212, cameras 1218, smart home assistant 1219, smart door lock 1220, and/or smart alarm system 1222 (collectively referred to as "the smart-home devices") are capable of data communications and information sharing with other smart devices, a central server or cloud-computing system, and/or other devices that are network-connected. Data communications may be carried out using any of a variety of custom or standard wireless protocols (e.g., IEEE 802.15.4, Wi-Fi, Matter, ZigBee, 3LoWPAN, Thread, Z-Wave, Bluetooth Smart, ISA100.5A, WirelessHART, MiWi, etc.) and/or any of a variety of custom or standard wired protocols (e.g., Ethernet, HomePlug, etc.), or any other suitable communication protocol, including communication protocols not yet developed as of the filing date of this document.

In some implementations, the smart devices serve as wireless or wired repeaters. In some implementations, a first one of the smart devices communicates with a second one of the smart devices via a wireless router. The smart devices may further communicate with each other via a connection (e.g., network interface 1260) to a network, such as the Internet. Through the Internet, the smart devices may communicate with a cloud-based server system 1264 (also called a cloud-based server system, central server system, and/or a cloud-computing system herein). Cloud-based server system 1264 may be associated with a manufacturer, support entity, or service provider associated with the smart device(s). In some implementations, a user is able to contact customer support using a smart device itself rather than needing to use other communication means, such as a telephone or Internet-connected computer. In some implementations, software updates are automatically sent from cloud-based server system 1264 to smart devices (e.g., when available, when purchased, or at routine intervals).

In some implementations, the network interface 1260 includes a conventional network device (e.g., a router), and the smart home environment 1200 of FIG. 12 includes a hub device 1280 that is communicatively coupled to the network(s) 1262 directly or via the network interface 1260. The hub device 1280 is further communicatively coupled to one or more of the above intelligent, multi-sensing, network-connected devices (e.g., smart devices of the smart home environment 1200). Each of these smart devices optionally communicates with the hub device 1280 using one or more radio communication networks available at least in the smart home environment 1200 (e.g., Matter, ZigBee, Z-Wave, Insteon, Bluetooth, Wi-Fi and other radio communication networks). In some implementations, the hub device 1280 and devices coupled with/to the hub device can be controlled and/or interacted with via an application running on a smart phone, household controller, laptop, tablet computer, game console or similar electronic device. In some implementations, a user of such a controller application can view the status of the hub device or coupled smart devices, configure the hub device to interoperate with smart devices newly introduced to the home network, commission new smart devices, and adjust or view settings of connected smart devices, etc. In some implementations the hub device extends capabilities of low capability smart devices to match capabilities of the highly capable smart devices of the same type, integrates functionality of multiple different device types—even across different communication protocols—and is configured to streamline adding of new devices and commissioning of the hub device. In some implementations, hub device 1280 further includes a local storage device for storing data related to, or output by, smart devices of smart home environment 1200. In some implementations, the data includes one or more of: video data output by a camera device, metadata output by a smart device, settings information for a smart device, usage logs for a smart device, and the like.

In some implementations, smart home environment 1200 includes a local storage device 1290 for storing data related to, or output by, smart devices of smart home environment 1200. In some implementations, the data includes one or more of: video data output by a camera device (e.g., cameras 1218 or smart doorbell 1206), metadata output by a smart device, settings information for a smart device, usage logs for a smart device, and the like. In some implementations, local storage device 1290 is communicatively coupled to one or more smart devices via a smart home network. In some implementations, local storage device 1290 is selectively coupled to one or more smart devices via a wired and/or wireless communication network. In some implementations, local storage device 1290 is used to store video data when external network conditions are poor. For example, local storage device 1290 is used when an encoding bitrate of cameras 1218 exceeds the available bandwidth of the external network (e.g., network(s) 1262). In some implementations, local storage device 1290 temporarily stores video data from one or more cameras (e.g., cameras 1218) prior to transferring the video data to a server system (e.g., cloud-based server system 1264).

Further included and illustrated in the exemplary smart home environment 1200 of FIG. 12 are service robots 1268, each configured to carry out, in an autonomous manner, any of a variety of household tasks. For some embodiments, the service robots 1268 can be respectively configured to perform floor sweeping, floor washing, etc.

In some embodiments, a service robot may follow a person from room to room and position itself such that the person can be monitored while in the room. The service robot may stop in a location within the room where it will likely be out of the way, but still has a relatively clear field-of-view of the room.

The systems and methods of the present disclosure may be implemented using hardware, software, firmware, or a combination thereof and may be implemented in one or more computer systems or other processing systems. Some embodiments of the present disclosure include a system including a processing system that includes one or more processors. In some embodiments, the system includes a non-transitory computer readable storage medium containing instructions which, when executed on the one or more processors, cause the system and/or the one or more processors to perform part or all of one or more methods and/or part or all of one or more processes disclosed herein. Some embodiments of the present disclosure include a computer-program product tangibly embodied in a non-transitory machine-readable storage medium, including instructions configured to cause the system and/or the one or more processors to perform part or all of one or more methods and/or part or all of one or more processes disclosed herein.

The terms and expressions which have been employed are used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention as claimed has been specifically disclosed by embodiments and optional features, modification, and variation of the concepts herein disclosed may be resorted to by those skilled in the art, and that such modifications and variations are considered to be within the scope of this invention as defined by the appended claims.

Specific details are given in the following description to provide a thorough understanding of the embodiments. However, it will be understood that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein can be combined with any other examples.

What is claimed is:

1. A smart thermostat comprising:

a display;

an ambient light sensor;

a radar sensor;

a processing system; and at least one computer-readable medium storing instructions which, when executed by the processing system, cause the smart thermostat to perform operations comprising:

measuring, using the ambient light sensor, a plurality of ambient light level values of an environment surrounding the smart thermostat;

displaying, on the display, content at a first brightness level;

acquiring, from the radar sensor, radar data indicative of motion in the environment surrounding the smart thermostat;

determining, based on the radar data, that a distance between a person and the smart thermostat is equal to or less than a predetermined distance; and in response to determining that the distance is less than the predetermined distance, starting a brightness lock mode, wherein starting the brightness lock mode causes the content to be displayed on the display at a second brightness level that is equal to or greater than the first brightness level.

2. The smart thermostat of claim 1, wherein starting the brightness lock mode comprises:

determining a maximum ambient light level value of the plurality of ambient light level values within a time window prior to starting the brightness lock mode;

using the maximum ambient light level value to extract an intermediate brightness level from the brightness curve; and determining the second brightness level based on the intermediate brightness level.

3. The smart thermostat of claim 1, the operations further comprising:

while in the brightness lock mode:

starting a timer for measuring a predetermined period of time;

determining that the person operated the smart thermostat; and in response to determining that the person operated the smart thermostat, restarting the timer.

4. The smart thermostat of claim 1, the operations further comprising:

while in the brightness lock mode:

starting a timer for measuring a predetermined period of time;

determining, based on additional radar data acquired from the radar sensor, that the distance between the person and the smart thermostat is equal to or less than the predetermined distance; and in response to determining that the distance between the person and the smart thermostat is equal to or less than the predetermined distance, restarting the timer.

5. The smart thermostat of claim 1, the operations further comprising:

while in the brightness lock mode:

starting a timer for measuring a predetermined period of time;

determining that the predetermined period of time has not elapsed;

in response to determining that the predetermined period of time has not elapsed, determining whether or not the person has operated the smart thermostat.

6. The smart thermostat of claim 1, the operations further comprising:

while in the brightness lock mode:

starting a timer for measuring a predetermined period of time;

determining that the predetermined period of time has elapsed;

in response to determining that the predetermined period of time has elapsed, ending the brightness lock mode and causing the content to be displayed on the display at a third brightness level.

7. The smart thermostat of claim 1, wherein the content is first content that includes an ambient temperature of the environment surrounding the smart thermostat, and starting the brightness lock mode causes second content to be displayed at the second brightness level, wherein the second content includes a temperature set point of an air management system in communication with the smart thermostat.

8. A method controlling a display of a smart thermostat, the method comprising:
- measuring, using an ambient light sensor of the smart thermostat, a plurality of ambient light level values of an environment surrounding the smart thermostat;
- displaying, on the display, content at a first brightness level;
- acquiring, from a radar sensor of the smart thermostat, radar data indicative of motion in the environment surrounding the smart thermostat;
- determining, based on the radar data, that a distance between a person and the smart thermostat is less than a predetermined distance; and
- in response to determining that the distance is less than the predetermined distance, starting a brightness lock mode, wherein starting the brightness lock mode causes the content to be displayed on the display at a second brightness level that is equal to or greater than the first brightness level.

9. The method of claim 8, wherein starting the brightness lock mode comprises:
- determining a maximum ambient light level value of the plurality of ambient light level values within a time window prior to starting the brightness lock mode;
- using the maximum ambient light level value to extract an intermediate brightness level from the brightness curve; and
- determining the second brightness level based on the intermediate brightness level.

10. The method of claim 8, the method further comprising:
- while in the brightness lock mode:
  - starting a timer for measuring a predetermined period of time;
  - determining that the person operated the smart thermostat; and
  - in response to determining that the person operated the smart thermostat, restarting the timer.

11. The method of claim 8, the method further comprising:
- while in the brightness lock mode:
  - starting a timer for measuring a predetermined period of time;
  - determining, based on additional radar data acquired from the radar sensor, that the distance between the person and the smart thermostat is equal to or less than the predetermined distance; and
  - in response to determining that the distance between the person and the smart thermostat is equal to or less than the predetermined distance, restarting the timer.

12. The method of claim 8, the method further comprising:
- while in the brightness lock mode:
  - starting a timer for measuring a predetermined period of time;
  - determining that the predetermined period of time has not elapsed;
  - in response to determining that the predetermined period of time has not elapsed, determining whether or not the person has operated the smart thermostat.

13. The method of claim 8, the method further comprising:
- while in the brightness lock mode:
  - starting a timer for measuring a predetermined period of time;
  - determining that the predetermined period of time has elapsed;
  - in response to determining that the predetermined period of time has elapsed, ending the brightness lock mode and causing the content to be displayed on the display at a third brightness level.

14. The method of claim 8, wherein the content is first content that includes an ambient temperature of the environment surrounding the smart thermostat, and starting the brightness lock mode causes second content to be displayed at the second brightness level, wherein the second content includes a temperature set point of an air management system in communication with the smart thermostat.

15. One or more non-transitory computer-readable media storing instructions which, when executed by a processing system, cause a smart thermostat to perform operations comprising:
- measuring, using an ambient light sensor of the smart thermostat, a plurality of ambient light level values of an environment surrounding the smart thermostat;
- displaying, on a display of the smart thermostat, content at a first brightness level;
- acquiring, from a radar sensor of the smart thermostat, radar data indicative of motion in the environment surrounding the smart thermostat;
- determining, based on the radar data, that a distance between a person and the smart thermostat is less than a predetermined distance; and
- in response to determining that the distance is less than the predetermined distance, starting a brightness lock mode, wherein starting the brightness lock mode causes the content to be displayed on the display at a second brightness level that is equal to or greater than the first brightness level.

16. The one or more non-transitory computer-readable media of claim 15, the operations further comprising:
- while in the brightness lock mode:
  - starting a timer for measuring a predetermined period of time;
  - determining that the person operated the smart thermostat; and
  - in response to determining that the person operated the smart thermostat, restarting the timer.

17. The one or more non-transitory computer-readable media of claim 15, the operations further comprising:
- while in the brightness lock mode:
  - starting a timer for measuring a predetermined period of time;
  - determining, based on additional radar data acquired from the radar sensor, that the distance between the person and the smart thermostat is equal to or less than the predetermined distance; and
  - in response to determining that the distance between the person and the smart thermostat is equal to or less than the predetermined distance, restarting the timer.

18. The one or more non-transitory computer-readable media of claim 15, the operations further comprising:
- while in the brightness lock mode:
  - starting a timer for measuring a predetermined period of time;
  - determining that the predetermined period of time has not elapsed;

in response to determining that the predetermined period of time has not elapsed, determining whether or not the person has operated the smart thermostat.

19. The one or more non-transitory computer-readable media of claim 15, the operations further comprising:

while in the brightness lock mode:

starting a timer for measuring a predetermined period of time;

determining that the predetermined period of time has elapsed;

in response to determining that the predetermined period of time has elapsed, ending the brightness lock mode and causing the content to be displayed on the display at a third brightness level.

20. The one or more non-transitory computer-readable media of claim 15, wherein the content is first content that includes an ambient temperature of the environment surrounding the smart thermostat, and starting the brightness lock mode causes second content to be displayed at the second brightness level, wherein the second content includes a temperature set point of an air management system in communication with the smart thermostat.

* * * * *